United States Patent
Wang et al.

(10) Patent No.: US 11,264,602 B2
(45) Date of Patent: Mar. 1, 2022

(54) SULFIDE GLASS-CERAMIC LITHIUM-ION SOLID-STATE CONDUCTOR

(71) Applicants: Samsung Electronics Co., Ltd., Suwon-si (KR); The Florida State University Research Foundation, Inc., Tallahassee, FL (US)

(72) Inventors: Yan Wang, Brookline, MA (US); Jeong-Ju Cho, Lexington, MA (US); Lincoln Miara, Lincoln, MA (US); Yan-Yan Hu, Tallahassee, FL (US); Xuyong Feng, Tallahassee, FL (US)

(73) Assignees: SAMSUNG ELECTRONICS CO., LTD., Gyeonggi-do (KR); THE FLORIDA STATE UNIVERSITY RESEARCH FOUNDATION, INC., Tallahassee, FL (US)

( * ) Notice: Subject to any disclaimer, the term of this patent is extended or adjusted under 35 U.S.C. 154(b) by 225 days.

(21) Appl. No.: 16/710,008

(22) Filed: Dec. 11, 2019

(65) Prior Publication Data

US 2020/0358082 A1   Nov. 12, 2020

Related U.S. Application Data

(60) Provisional application No. 62/845,190, filed on May 8, 2019.

(51) Int. Cl.
| | |
|---|---|
| *H01M 4/134* | (2010.01) |
| *H01M 10/0525* | (2010.01) |
| *H01M 4/38* | (2006.01) |
| *H01M 4/1395* | (2010.01) |
| *H01M 4/02* | (2006.01) |

(52) U.S. Cl.
CPC ......... *H01M 4/134* (2013.01); *H01M 4/1395* (2013.01); *H01M 4/387* (2013.01); *H01M 10/0525* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| 6,277,524 B1 | 8/2001 | Kanno |
| 8,697,292 B2 | 4/2014 | Kanno et al. |

(Continued)

FOREIGN PATENT DOCUMENTS

| CN | 101013753 A | 8/2007 |
| CN | 100502111 C | 6/2009 |

(Continued)

OTHER PUBLICATIONS

Deiseroth et al., "Li6PS5X: A class of Li-rich solids with an unusually high Li+ mobility", Angewant Chemie, vol. 47, issue 4, pp. 755-758, 2008 (Year: 2008).*

(Continued)

*Primary Examiner* — Wyatt P McConnell
(74) *Attorney, Agent, or Firm* — Cantor Colburn LLP

(57) ABSTRACT

A compound of Formula 1:

$$\text{Li}_{1+2x-y}\text{Zn}_{1-x}\text{PS}_{4-y-\delta}\text{A}_y \quad (1)$$

wherein A is halogen, $0 \le x \le 1$, $0 \le y \le 0.5$, and $0 \le \delta \le 0.5$, and wherein the compound of Formula 1 has an body centered cubic crystal structure. Also a lithium battery and an electrode including the compound.

23 Claims, 19 Drawing Sheets

(56) References Cited

U.S. PATENT DOCUMENTS

| | | |
|---|---|---|
| 9,142,861 B2 | 9/2015 | Homma et al. |
| 2013/0040208 A1 | 2/2013 | Kanno et al. |
| 2014/0272554 A1 | 9/2014 | Yanagi et al. |
| 2014/0272602 A1 | 9/2014 | Handa et al. |
| 2015/0017548 A1 | 1/2015 | Kato et al. |
| 2015/0214574 A1 | 7/2015 | Tanaka |
| 2016/0351879 A1 | 12/2016 | Visco et al. |
| 2017/0194662 A1 | 7/2017 | Kambara et al. |
| 2017/0222257 A1 | 8/2017 | Miyashita et al. |
| 2017/0331149 A1 | 11/2017 | Sasaki et al. |

FOREIGN PATENT DOCUMENTS

| | | |
|---|---|---|
| CN | 103401018 A | 11/2013 |
| CN | 103390769 A | 6/2015 |
| JP | 5158008 B2 | 12/2012 |
| JP | 2013033659 A | 2/2013 |
| JP | 2013037897 A | 2/2013 |
| KR | 1020120136372 A | 12/2012 |
| KR | 1020140116158 A | 10/2014 |

OTHER PUBLICATIONS

Jorgens et al., "Motifs of Closest Packings: The Compounds $Zn_3(PS_4)_2$ and $LiZnPS_4$", Z. Anorg. Allg. Chem, 628, 2002, 1765-1769.

Liu et al., Anomalous High Ionic Conductivity of Nanoporous $B-Li_3ps_4$, Journal of the American Chemical Society, vol. 135, No. 3, 2013, pp. 975-978.

Muramatsu et al., "Structural change of $Li_2S-P_2S_5$ sulfide solid electrolytes in the atmosphere", Solid State Ionic, 182, 2011, 116-119.

Non Final Office Action for U.S. Appl. No. 15/226,179, filed Aug. 2, 2016; dated Nov. 14, 2018; 17 pages.

Richards et al., "Design Of $L1+2Xzn1-Xps4$, A new lithium ion conductor", Energy & Environmental Science, vol. 9, No. 10, 2016, pp. 3272-3278.

Tomei et al., "Preparation of Amorphous Materials in the system $LiI-Li_2S-P_2S_5$ by Mechanical Milling and Their Lithium Ion Conducting Properties", The 29th Symposium on Solid State Ionics in Japan, 2003, 26-27.

Wang et al., "Design principles for solid-state lithium superionic conductors", Nature Materials, 2015, 1-7.

Suzuki, Naoki et al., "Synthesis and Electrochemical Properties of I4-Type $Li1+2xZn1-xPS4$ Solid Electrolyte", Chem. Mater. 2018, 30; pp. 2236-2244.

* cited by examiner

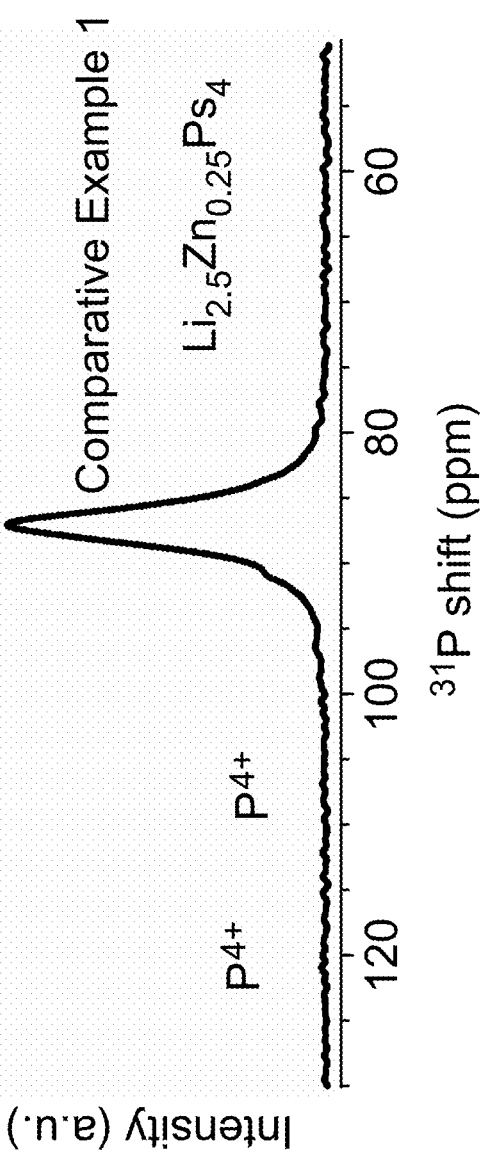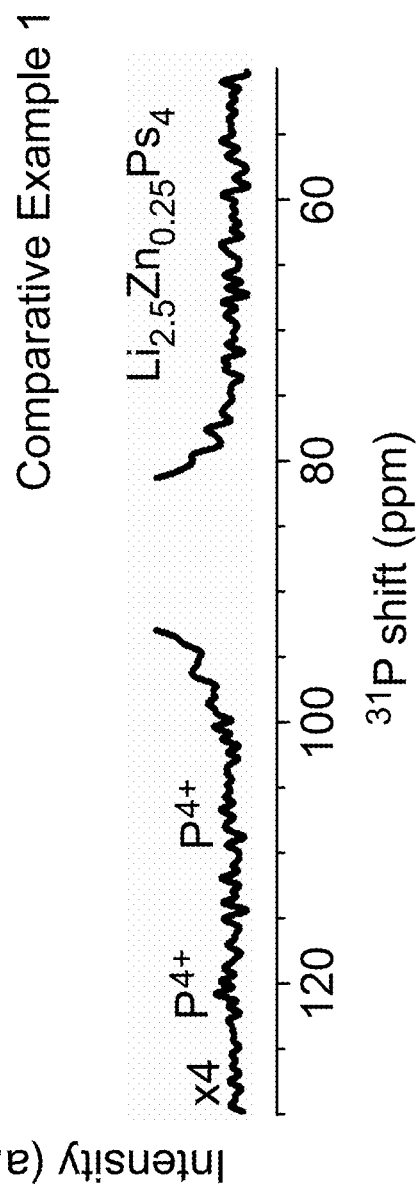
FIG. 10A
FIG. 10B

SULFIDE GLASS-CERAMIC LITHIUM-ION SOLID-STATE CONDUCTOR

CROSS-REFERENCE TO RELATED APPLICATION

This application claims priority to and the benefit of U.S. Provisional Patent Application No. 62/845,190, filed on May 8, 2019, and all the benefits accruing therefrom under 35 U.S.C. § 119, the content of which is incorporated herein in its entirety by reference.

BACKGROUND

1. Field

The present disclosure relates to a lithium sulfide compound, a lithium solid electrolyte comprising the lithium sulfide compound, a lithium battery including the lithium sulfide compound, and a method of preparing the lithium sulfide compound.

2. Description of the Related Art

Lithium batteries having high voltage and high energy density are used to power a variety of devices, including electric vehicles, laptop computers, and cellphones. Lithium batteries have been found particularly useful for these purposes since they can charge, store, and discharge a relatively large amount of electricity and can operate over long periods of battery use.

A lithium battery designed to operate at a high voltage (e.g., 5 volts or more) may include a liquid electrolyte, e.g., an electrolyte prepared by dissolving a lithium salt in an organic solvent. Such lithium batteries may be chemically unstable because of the inherent instability of the electrolyte at 5 volts. In addition, the liquid electrolyte presents a risk of leakage, fire, and explosion.

A solid-state lithium battery including a solid lithium ion electrolyte should present improved safety. Nonetheless, there remains a need for an improved solid-state lithium ion conductor.

SUMMARY

Provided is a compound which may be used as a solid electrolyte having both high lithium ion conductivity and excellent chemical stability.

Disclosed is a compound represented by Formula 1:

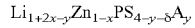

wherein A is halogen, $0 \leq x \leq 1$, $0 \leq y \leq 0.5$, and $0 \leq \delta \leq 0.5$.

Also disclosed is a protected positive electrode active material including: a positive electrode active material; and the compound of Formula 1 on a surface of the positive electrode active material.

Also disclosed is a protected positive electrode including: a positive electrode including a positive electrode active material; and the compound of Formula 1 on the positive electrode.

Also disclosed is a protected negative electrode active material including: a negative electrode active material; and the compound of Formula 1 on a surface of the negative electrode active material.

Also disclosed is a protected negative electrode including: a negative electrode active material; and the compound of Formula 1 on the negative electrode.

Also disclosed is a lithium-ion battery including: a positive electrode; a negative electrode; and the compound of Formula 1 between the positive electrode and the negative electrode.

Also disclosed is an electrolyte composition including: the compound of Formula 1; and a solvent, a binder, or a combination thereof.

Also disclosed is a method of preparing a lithium-ion conductor, the method including: providing an element A precursor, a Li precursor, a P precursor, a Zn precursor, and a S precursor; contacting the element A precursor, the Li precursor, the P precursor, the Zn precursor, and the S precursor to prepare a mixture; and heat-treating the mixture to prepare the compound of Formula 1

$$Li_{1+2x-y}Zn_{1-x}PS_{4-y-\delta}A_y \quad (1)$$

wherein A is halogen, $0 \leq x \leq 1$, $0 \leq y \leq 0.5$, and $0 \leq \delta \leq 0.5$.

Also disclosed is a method of manufacturing a lithium battery, the method including: providing a positive electrode; providing a negative electrode; and disposing an electrolyte layer comprising the compound of claim 1 between the positive electrode and the negative electrode to manufacture the lithium battery.

BRIEF DESCRIPTION OF THE DRAWINGS

These and/or other aspects will become apparent and more readily appreciated from the following description, taken in conjunction with the accompanying drawings in which:

FIG. 10A is a graph of intensity (a.u.) versus chemical shift (ppm versus $Li_3PO_4$ at 0 ppm) showing the results of $^{31}$P NMR analysis of Comparative Example 1;

FIG. 10B is an expanded view of FIG. 10A;

Figure 1:
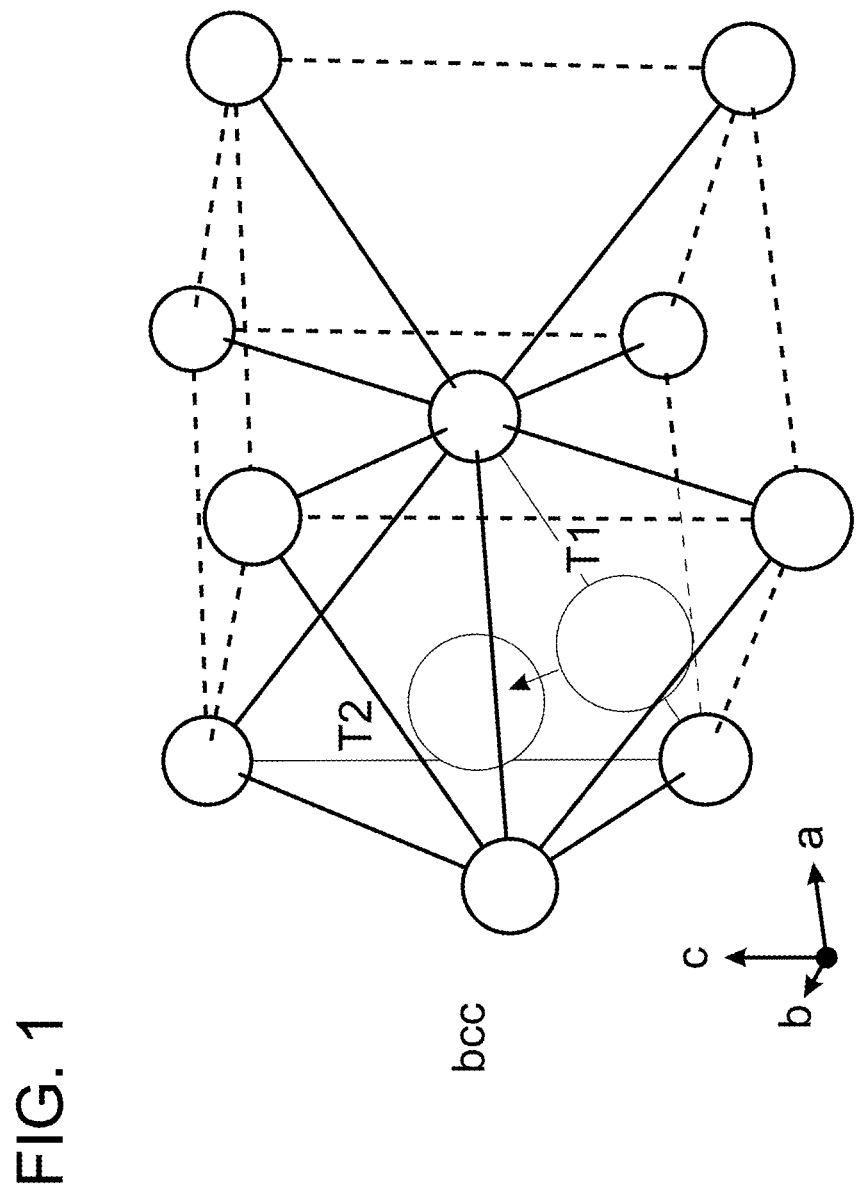
FIG. 1 is a schematic illustration of a body centered cubic structure with lithium migration pathway from one tetrahedral site to another.

DETAILED DESCRIPTION $Li_{2.5}Zn_{0.25}PS_4$ has been reported as a material having excellent chemical stability, lithium ion conductivity, and low interface resistance. See, for example, U.S. patent application Ser. No. 15/226,179, which has issued as U.S. Pat. No. 10,446,872, the content of which is incorporated herein by reference, in its entirety. However, amorphous $Li_{2.5}Zn_{0.25}PS_4$ has a relatively low lithium ion conductivity, in a range of 0.3 millisiemen per centimeter (mS/cm) to 0.6 mS/cm. Therefore, when amorphous $Li_{2.5}Zn_{0.25}PS_4$ is used as a solid electrolyte in a battery, internal resistance can result in heat generation and battery degradation. Therefore, it is desirable to develop a solid electrolyte having both improved lithium ion conductivity and excellent chemical stability.

The inventors have discovered that by adding a halogen to a $Li_{1+2x}Zn_xPS_4$ type material, e.g., to provide $Li_{2.4}Zn_{0.25}PS_{3.9}Cl_{0.1}$, which contains 3.9 moles of sulfur with respect to 2.4 moles of lithium, improved lithium ion conductivity results. While not wanting to be bound by this theory, the inventors observe that when doped with a halogen, $Li_3PS_4$ impurity content is reduced and crystallinity is increased. Based on this discovery, a solid electrolyte having both improved lithium ion conductivity and improved chemical stability, relative to $Li_{2.5}Zn_{0.25}PS_4$, is provided.

Solid Electrolyte Material

Disclosed is a compound represented by Formula 1:

$$Li_{1+2x-y}Zn_{1-x}PS_{4-y-\delta}A_y \quad (1)$$

wherein A is halogen, 0≤x≤1, 0≤y≤0.5, and 0≤δ≤0.5.

In an aspect, A in Formula 1 may be Cl, Br, I, or a combination thereof. In an aspect, A in Formula 1 may be Cl or Br. For example, A in Formula 1 may be Cl.

In an aspect, in Formula 1, x is 0≤x≤1, 0<x≤1, 0<x<1, 0.1≤x≤0.9, 0.1<x≤0.9, 0.1<x<0.9, 0.2≤x≤0.8, 0.2<x≤0.8, 0.2<x<0.7, 0.3≤x≤0.7, 0.3<x≤0.7, 0.3<x<0.7, 0.4≤x≤0.6, 0.4<x≤0.6, or 0.4<x<0.6. For example, x may satisfy 0.63≤x≤0.75. When x in Formula 1 is within the disclosed range, the compound may have further improved properties.

In an aspect, in Formula 1, y is 0≤y≤0.5, 0<y≤0.5, 0<y<0.5, 0.1≤y≤0.4, 0.1<y≤0.4, 0.1<y<0.4, 0.15≤y≤0.35, 0.15<y≤0.35, or 0.15<y<0.35. For example, y may satisfy 0.1≤y≤0.45. For example, y may satisfy 0.2≤y≤0.35. For example, y may satisfy 0.23≤y≤0.3. For example, y may satisfy 0.23≤y≤0.3. When y of Formula 1 is within the disclosed range, a solid electrolyte may have further improved properties.

In an embodiment, in Formula 1, δ may satisfy 0≤δ≤0.5, 0<δ≤0.5, 0<δ<0.5, 0.1≤δ≤0.4, 0.1<δ≤0.4, 0.1<δ<0.4, 0.15≤δ≤0.35, 0.15<δ≤0.35, or 0.15<δ<0.35. For example, δ may satisfy 0.1≤δ≤0.45. For example, δ may satisfy 0.15≤δ≤0.35. For example, δ may satisfy 0.23≤δ≤0.33. When δ of Formula 1 is within the disclosed range, a solid electrolyte may have further improved properties.

In an aspect, a content of lithium in Formula 1 is (1+2x−y), and is 0 to 3, 0.1 to 2.9, 0.2 to 2.8, or 0.3 to 2.7.

In an aspect, the compound of Formula 1 is $Li_{2.4}Zn_{0.25}PS_{3.9}Cl_{0.1}$.

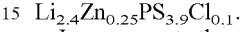

In an aspect, the compound of Formula 1 may have a body-centered cubic (BCC) crystal structure, and may have a body centered cubic anion lattice. While not wanting to be bound by theory, it is understood that the compound of Formula 1 adopts a structure in which the body-centered cubic anion lattice comprises corner sharing $ZnS_4$ and $PS_4$ tetrahedra. As shown schematically in FIG. 1, materials having the BCC structure are understood to provide a lithium ion migration path having a lower energy barrier, e.g., from tetrahedral site T1 to tetrahedral site T2 in FIG. 1, which is understood to result in the observed improved ion conductivity. In further detail, it is understood that the anion $S^{2-}$ sublattice may allow lithium ions to migrate within a network of interconnected tetrahedral sites, thereby leading to a lower activation energy barrier and improved lithium ion conductivity, relative to materials having a different structure, e.g., a face-centered cubic structure.

The Applicants have unexpectedly discovered that by including the halogen, e.g., A in Formula 1, ion conductivity is further improved. While not wanting to be bound by theory, it is understood that the improved conductivity is a result of reduced impurity content and improved crystallinity that occurs when the halogen, A in Formula 1, is included. In further detail, it is understood that a content of a $Li_3PS_4$ impurity is reduced when the halogen is included, and that the reduced $Li_3PS_4$ content results in improved crystallinity, resulting in improved ion conductivity.

In addition, and again not wanting to be bound by theory, it is understood that the introducing a halogen, e.g., Cl, increases entropy and improves the conductivity and activation energy, and the $P^{4+}$ is understood to stabilize the solid electrolyte material of Formula 1.

In an aspect, the compound of Formula 1 may have a lithium ion conductivity of 1×10$^{-4}$ mS/cm to 10 mS/cm, 5×10$^{-4}$ mS/cm to 5 mS/cm, 1×10$^{-3}$ mS/cm to 1 mS/cm, or 5×10$^{-3}$ mS/cm to 0.1 mS/cm. For example, the compound of Formula 1 may have a lithium ion conductivity of greater than or equal to 10$^{-3}$ mS/cm, greater than or equal to 10$^{-2}$ mS/cm, or greater than or equal to 10$^1$ mS/cm, at room temperature, e.g., 20° C. Ion conductivity may be determined by complex impedance at 20° C., further details of which can be found in J.-M. Winand et al., "Measurement of Ionic Conductivity in Solid Electrolytes," Europhysics Letters, vol. 8, no. 5, p. 447-452, 1989. Additional details may be determined by one of skill in the art without undue experimentation.

Also, the compound of Formula 1 may be electrically insulating, and may have an electronic conductivity of 1×10$^{-9}$ S/cm to 1×10$^{-3}$ S/cm, 1×10$^{-8}$ S/cm to 1×10$^{-4}$ S/cm, 1×10$^{-7}$ S/cm to 1×10$^{-5}$ S/cm. The electronic conductivity may be determined by an eddy current method or a kelvin bridge method. The electrical conductivity can be determined according to ASTM B-193, "Standard Test Method for Resistivity of Electrical Conductor Materials," e.g., at 20° C., or according to ASTM E-1004, "Standard Test Method for Determining Electrical Conductivity Using the Electromagnetic (Eddy-Current) Method," e.g., at 20° C. Additional details may be determined by one of skill in the art without undue experimentation.

A $^{31}$P Nuclear Magnetic Resonance Spectroscopy (NMR) of the compound of Formula 1 may show a feature resulting from $P^{4+}$. Without being limited by theory, the presence of $P^{4+}$ may suggest charge compensation due to the loss of S and the oxidation state of P may change from 5+ to 4+. The $P^{4+}$ may lead to a lower activation energy barrier and a high ion conductivity, relative to a material without $P^{4+}$.

A $P^{4+}$ resonance of the compound of Formula 1 may include a first resonance at 105 parts per million (ppm) to 111 ppm, a second resonance at 115 ppm to 125 ppm, or a combination thereof, when analyzed by $^{31}$P NMR. The first resonance may be at 106 ppm to 110 ppm, or 107 ppm to 109 ppm, and the second resonance may be at 116 ppm to 124 ppm, or 117 ppm to 123 ppm.

In an embodiment, an area of the $P^{4+}$ resonance of the compound of Formula 1 may be 1% to 50%, 2% to 45%, or 3% to 40%, based on the total area of the $^{31}$P resonance, when analyzed by $^{31}$P NMR.

The compound of Formula 1 can be in any suitable form, such as that of a particle or a film. The particle can have, for example, a spherical form, an oval-spherical form, or the like. The particle diameter is not particularly limited, and a mean particle diameter ranging, for example, from 0.01 μm to 30 μm, for example, 0.1 μm to 20 μm is mentioned. A mean particle diameter refers to a number average diameter (D50) of the particle size distribution of particles obtained by light scattering, or the like. The solid electrolyte can be prepared, for example, by mechanical milling to provide a suitable particle size. The film may have any suitable dimensions, and may have a thickness of 1 nanometer (nm) to 1 micrometer (μm), 10 nm to 800 nm, or 100 nm to 600 nm.

Figure 2:
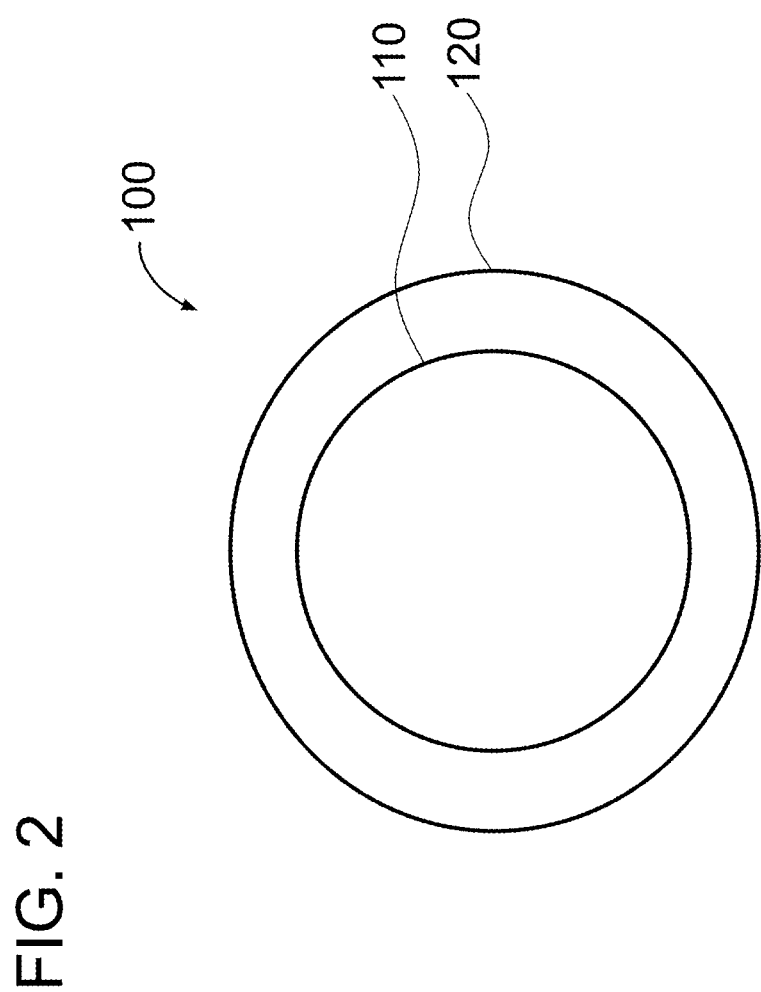
FIG. 2 is a schematic illustration of a protected positive electrode active material.

Also disclosed is a protected positive electrode active material, as shown in FIG. 2. A protected positive electrode active material 100 may comprise a positive electrode active material 110, and having a protective layer 120 comprising the compound of Formula 1. While not wanting to be bound by theory, it is understood that the disclosed compound of Formula 1 may be used to protect or otherwise passivate a surface of a positive electrode active material, avoiding an undesired reaction of the positive electrode active material with another material, such as a liquid electrolyte or air, for example. In an aspect, the protected positive electrode active material may comprise a core, and a shell, wherein the shell comprises the compound of Formula 1, and the core comprises a positive electrode active material. The shell may have any suitable dimensions, and may have a thickness of 1 nm to 1 micrometer (μm), 10 nm to 800 nm, or 100 nm to 600 nm. Also, the shell may entirely cover or encapsulate a surface of the core, or may cover or encapsulate 1% to 99%, 2% to 95%, or 4% to 90% of a total surface of the core.

The positive active material can be a compound represented by any of the Formulas: $Li_pM^1_{1-q}M^2_qD_2$ wherein 0.90≤p≤1.8 and 0≤q≤0.5; $Li_pE_{1-q}M^2_qO_{2-x}D_x$ wherein 0.90≤p≤1.8, 0≤q≤0.5, and 0≤x≤0.05; $LiE_{2-q}M^2_qO_{4-x}D_x$ wherein 0≤q≤0.5 and 0≤x≤0.05; $Li_pNi_{1-q-r}Co_qM^2_rD_x$ wherein 0.90≤p≤1.8, 0≤q≤0.5, 0≤r≤0.05, and 0<x≤2; $Li_pNi_{1-q-r}Co_qM^2_rO_{2-x}X_x$ wherein 0.90≤p≤1.8, 0≤q≤0.5, 0≤r≤0.05, and 0<x≤2; $Li_pNi_{1-q-r}Co_pM^2_rO_{2-x}X_x$ wherein 0.90≤p≤1.8, 0≤q≤0.5, 0≤r≤0.05, and 0<x≤2; $Li_pNi_{1-q-r}Mn_qM^2_rD_x$ wherein 0.90≤p≤1.8, 0≤q≤0.5, 0≤r≤0.05, and 0<x≤2; $Li_pNi_{1-q-r}Mn_qM^2_rO_{2-p}X_x$ wherein 0.90≤p≤1.8, 0≤q≤0.5, 0≤r≤0.05, and 0<x≤2; $Li_pNi^{1-q-r}Mn_qM^2_rO_{2-x}X_x$ wherein 0.90≤p≤1.8, 0≤q≤0.5, 0≤r≤0.05, and 0<x<2; $Li_pNi_qE_rG_dO_2$ wherein 0.90≤p≤1.8, 0≤q≤0.9, 0≤r≤0.5, and 0.001≤d≤0.1; $Li_pNi_qCo_rMn_dGeO_2$ wherein 0.90≤p≤1.8, 0≤q≤0.9, 0≤r≤0.5, 0≤d≤0.5, and 0.001≤e≤0.1; $Li_pNiG_qO_2$ wherein 0.90≤p≤1.8 and 0.001≤q≤0.1; $Li_pCoG_qO_2$ wherein 0.90≤p≤1.8 and 0.001≤q≤0.1; $Li_pMnG_qO_2$ where 0.90≤p≤1.8 and 0.001≤q≤0.1; $Li_pMn_2G_qO_4$ wherein 0.90≤p≤1.8 and 0.001≤q≤0.1; $QO_2$; $QS_2$; $LiQS_2$; $V_2O_5$; $LiV_2O_2$; $LiRO_2$; $LiNiVO_4$; $Li_{(3-f)}J_2(PO_4)_3$ (0≤f≤2); $Li_{(3-f)}Te_2(PO_4)_3$ wherein 0≤f≤2; or $LiFePO_4$, in which in the foregoing positive active materials $M^1$ is Ni, Co, or Mn; $M^2$ is Al, Ni, Co, Mn, Cr, Fe, Mg, Sr, V, or a rare-earth element; D is O, F, S, or P; E is Co or Mn; X is F, S, or P; G is Al, Cr, Mn, Fe, Mg, La, Ce, Sr, or V; Q is Ti, Mo or Mn; R is Cr, V, Fe, Sc, or Y; and J is V, Cr, Mn, Co, Ni, or Cu. Examples of the positive active material include $LiCoO_2$, $LiMn_xO_{2x}$ where x=1 or 2, $LiNi_{1-x}Mn_xO_{2x}$ where 0<x<1, $LiNi_{1-x-y}Co_xMn_yO_2$ where 0≤x≤0.5 and 0≤y≤0.5, $LiFePO_4$, $TiS_2$, $FeS_2$, $TiS_3$, or $FeS_3$. A combination comprising at least one of the foregoing may be used. The positive active material can comprise a composite oxide of lithium and a metal. The metal may be cobalt, manganese, aluminum, nickel, or a combination thereof. Mentioned is an aspect in which the positive active material is a NCA material represented by $Li_xNi_yE_zG_dO_2$, wherein 0.90≤x≤1.8, 0≤y≤0.9, 0≤z≤0.5, 0.001≤d≤0.1, E is Co, Mn, or a combination thereof, and G is Al, Cr, Mn, Fe, Mg, La, Ce, Sr, V, or a combination thereof. In an implementation, the positive active material may include, e.g., lithium cobalt oxide, lithium nickel cobalt manganese oxide, lithium nickel cobalt aluminum oxide, or a combination thereof. While not wanting to be bound by theory, it is understood that the compound of Formula 1 is effective to protect the positive active material, e.g., to prevent or suppress reaction with the electrolyte.

Figure 3:
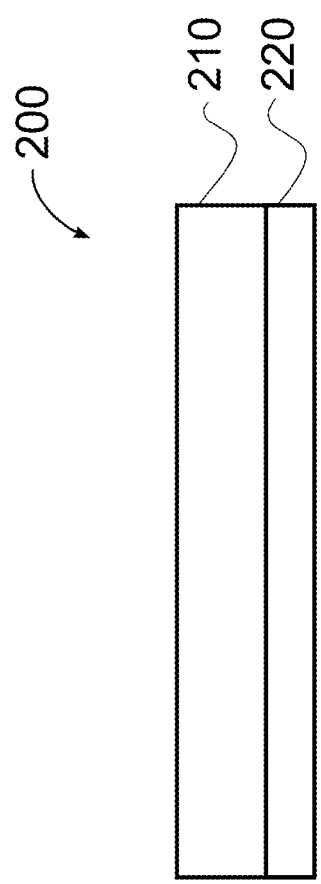
FIG. 3 is a schematic illustration of a positive electrode.

Also disclosed is a protected positive electrode 200 comprising: a positive electrode layer 210 comprising the positive electrode active material; and a protective layer 220 comprising the compound of Formula 1 on the positive electrode, as shown in FIG. 3. The protective layer comprising the compound of Formula 1 may have a thickness of 1 nanometer (nm) to 1 micrometer (μm), 20 nm to 0.5 μm, or 40 nm to 100 nm. The positive electrode layer may be on a current collector, e.g., an aluminum current collector, if desired.

Also disclosed is a protected positive electrode comprising a positive electrode layer comprising the protected positive electrode active material, and having the protective layer comprising the compound of Formula 1 on the positive electrode layer comprising the protected positive electrode active material. The positive electrode layer may be on a current collector, e.g., an aluminum current collector, if desired.

The electrode layer may further comprise a conductive agent, a binder, or a combination thereof. The conductive agent can include, for example, carbon black, carbon fiber, graphite, carbon nanotubes, graphene, or a combination thereof. The carbon black can be, for example, acetylene black, Ketjen black, Super P carbon, channel black, furnace black, lamp black, thermal black, a metal fiber; a metal powder such as a fluorinated carbon powder, an aluminum powder, or a nickel powder; a conductive whisker such as a zinc oxide or a potassium titanate; or a polyphenylene derivative, or a combination thereof. The graphite can be a natural graphite or an artificial graphite. A combination comprising at least one of the foregoing conductive agents can be used.

The binder can facilitate adherence between components of the electrode, such as the positive active material and the conductor, and adherence of the electrode to a current collector. Examples of the binder can include polyacrylic acid (PAA), polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene-butadiene-rubber, fluorinated rubber, a copolymer thereof, or a combination thereof. The amount of the binder can be in a range of about 1 part by weight to about 10 parts by weight, for example, in a range of about 2 parts by weight to about 7 parts by weight, based on a total weight of the positive active material. When the amount of the binder is in the range above, e.g., about 1 part by weight to about 10 parts by weight, the adherence of the electrode to the current collector may be suitably strong.

Figure 4:
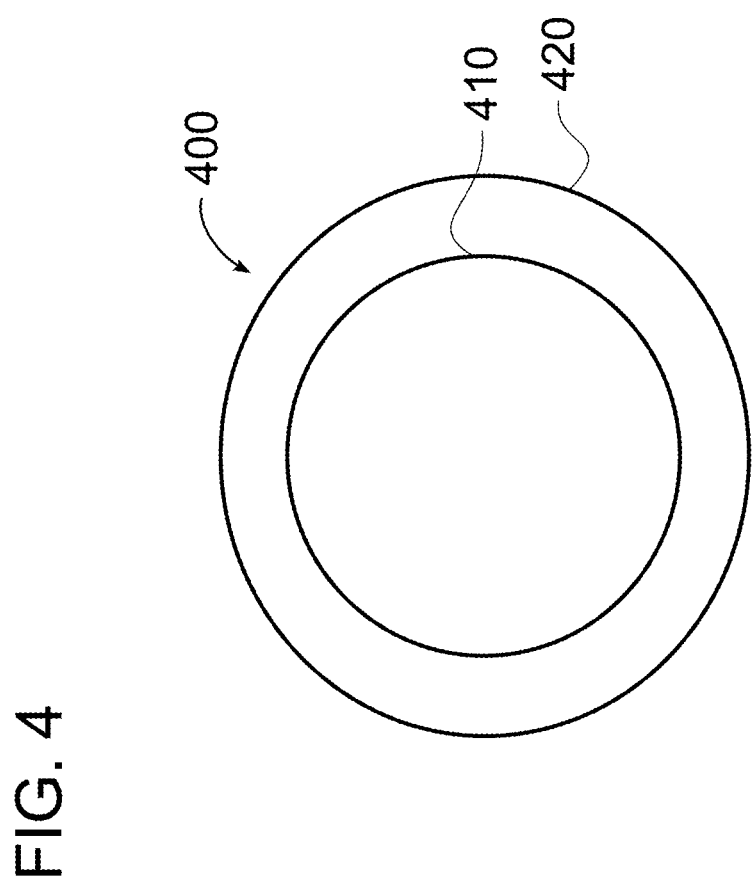
FIG. 4 is a schematic illustration of protected negative electrode active material.

Also disclosed is a protected negative electrode active material comprising: a negative electrode active material; and the compound of Formula 1 on a surface of the negative electrode active material, as shown in FIG. 4. A protected negative electrode active material 400 may comprise a negative electrode active material 410, and a protective layer 420 comprising the compound of Formula 1 on as surface of the negative electrode active material. The negative active material may comprise a material capable of storing and releasing a lithium ion electrochemically at a suitable electrochemical potential. A negative active material can comprise a lithium-containing metal or alloys, for example lithium metal, or a lithium alloy comprising Si, Sn, Sb, Ge, or a combination thereof. A lithium-containing metal oxide, metal nitride, or a metal sulfide can be used. Mentioned is an aspect wherein the metal is Si, Ti, Mo, Sn, Fe, Sb, Co, V, or a combination thereof. A carbon, such as a hard carbon, soft carbon, carbon black, Ketjen black, acetylene black, activated carbon, carbon nanotubes, carbon fiber, graphite, or an amorphous carbon can be used. A non-transition metal oxide such as $SnO_2$, $SiO_x$ (where $0<x\leq2$), or a combination thereof, can be used. Also usable is phosphorous, or a metal doped with phosphorous (e.g., $NiP_3$). The negative active material is not limited to the foregoing and any suitable negative active material can be used. The negative active material may be disposed on a current collector, such as a copper current collector, to provide a negative electrode. In an aspect, the negative electrode comprises graphite. In an aspect, the negative electrode comprises lithium metal or a lithium metal alloy. Use of lithium metal is mentioned.

The protection layer comprising the compound of Formula 1 may have any suitable dimensions, and may have a thickness of 1 nm to 1 micrometer (µm), 10 nm to 800 nm, or 100 nm to 600 nm. Also, the protection layer may entirely cover or encapsulate a surface of the negative active material, or may cover or encapsulate 1% to 99%, 2% to 95%, or 4% to 90% of a total surface of the negative active material.

Figure 5:
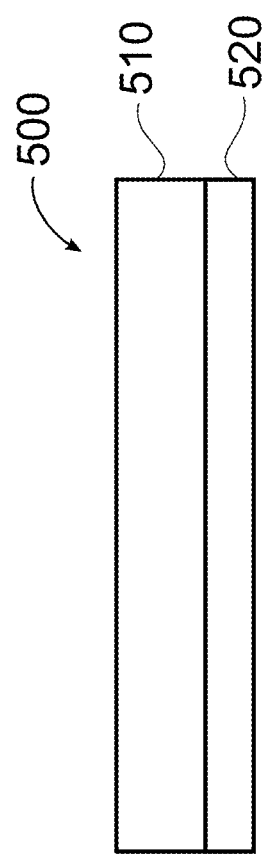
FIG. 5 is a schematic illustration of a protected negative electrode.

Also disclosed is a protected negative electrode comprising: a negative electrode comprising the negative electrode active material; and the compound of Formula 1 on the negative electrode. The compound of Formula 1 may be in the form of a protective layer on a negative electrode layer comprising the negative electrode active material, as shown in FIG. 5. FIG. 5 shows a protected negative electrode 300, comprising the negative electrode active material 510, and having the protective layer 520, comprising the compound of Formula 1 on the negative electrode layer. The protective layer comprises the compound of Formula 1 may have a thickness of 1 nanometer (nm) to 1 micrometer (µm), 20 nm to 0.5 µm, or 40 nm to 100 nm.

Also disclosed is a protected negative electrode comprising the protected negative electrode active material, and having the protective layer comprising the compound of Formula 1 on a negative electrode layer comprising the protected negative electrode active material. The protective layer may have any suitable dimensions, and may have a thickness of 1 nm to 1 micrometer (µm), 10 nm to 800 nm, or 20 nm to 500 nm.

Also disclosed is a lithium battery comprising: a positive electrode; a negative electrode; and the compound of Formula 1 between the positive electrode and the negative electrode. The positive electrode comprises the positive electrode active material, and optionally the conductive agent and the binder, as is further disclosed above. The positive electrode may comprise the protected positive electrode active material. The positive electrode may be the protected positive electrode, as disclosed herein, comprising a protective layer comprising the compound of Formula 1 on a positive electrode layer comprising a positive electrode active material. The negative electrode comprises the negative electrode active material, and optionally a conductive agent and a binder, as is further disclosed above. The negative electrode may comprise the protected negative electrode active material. The negative electrode may comprise the protected negative electrode, as disclosed herein, comprising the protective layer comprising the compound of Formula 1 on a negative electrode layer comprising the negative electrode active material. When the negative electrode comprises lithium metal, the battery can be referred to as a lithium battery. When the negative electrode comprises a lithium intercalation compound the battery can be referred to as a lithium ion battery.

Figure 6:
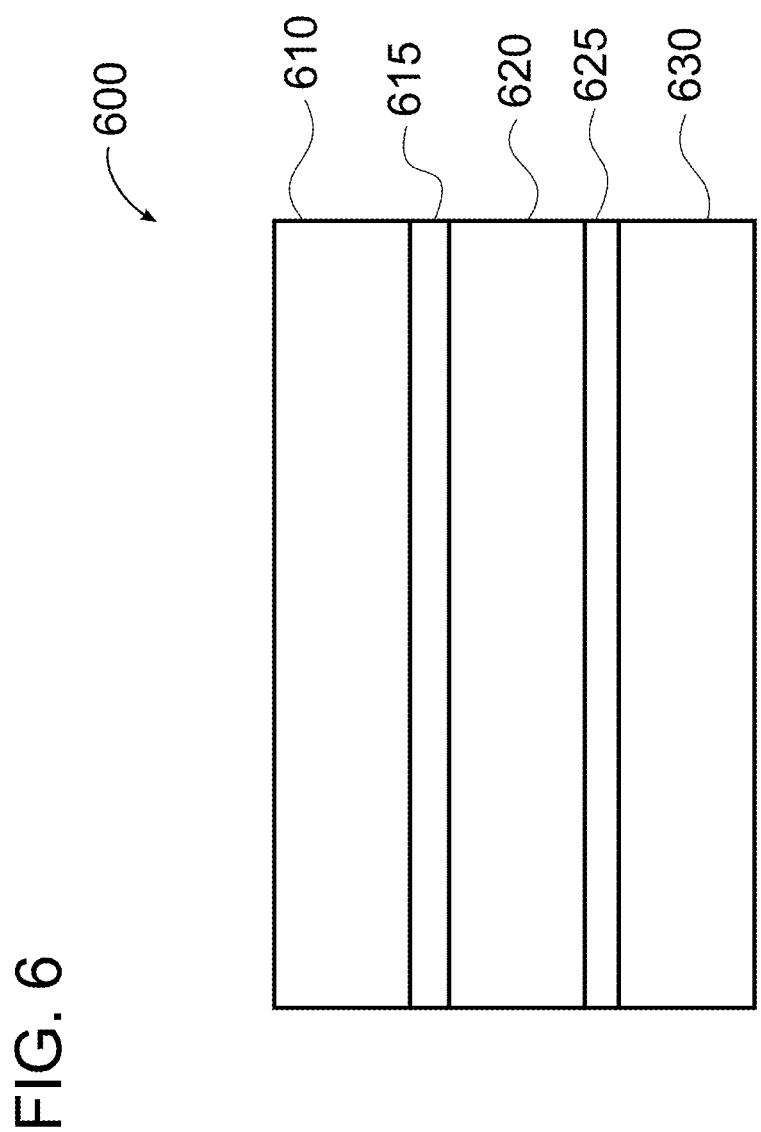
FIG. 6 is a schematic illustration of a battery.

As shown in FIG. 6 a battery 600, e.g., a lithium battery or a lithium ion battery, comprises a positive electrode 610, a negative electrode 630, and an electrolyte layer 620 comprising an electrolyte between the positive electrode and the negative electrode. A first protective layer 615 may be provided between the positive electrode 610 and the electrolyte layer 620. Similarly, a second protective layer 625 may be provided between the negative electrode 630 and the electrolyte layer 620. Each of the first and second protective layers is optional and may be omitted if desired.

The electrolyte may be disposed in the positive electrode, in the negative electrode, between the positive electrode and the negative electrode, or a combination thereof.

The electrolyte may comprise the compound of Formula 1. The compound of Formula 1 can be combined with another lithium conductive material to provide an electrolyte composition comprising the compound of Formula 1. The lithium conductive material can comprise a glass, a ceramic, or a combination thereof, and may be crystalline or polycrystalline. The lithium conductive material can comprise a sulfide solid electrolyte or an oxide solid electrolyte, such as a garnet-type solid state electrolyte.

The sulfide solid electrolyte may comprise $Li_2S-P_2S_5$, $Li_2S-P_2S_5-LiX$, wherein X is a halogen element, $Li_2S-P_2S_5-Li_2O$, $Li_2S-P_2S_5-Li_2O-LiI$, $Li_2S-SiS_2$, $Li_2S-SiS_2-LiI$, $Li_2S-SiS_2-LiBr$, $Li_2S-SiS_2-LiCl$, $Li_2S-SiS_2-B_2S_3-LiI$, $Li_2S-SiS_2-P_2S_5-LiI$, $Li_2S-B_2S_3$, $Li_2S-P_2S_5-Z_mS_n$, wherein m and n are positive numbers, Z is one of Ge, Zn or Ga, $Li_2S-GeS_2$, $Li_2S-SiS_2-Li_3PO_4$, $Li_2S-SiS_2-Li_pM^1O_q$ wherein p and q are positive numbers, $M^1$ is P, Si, Ge, B, Al, Ga, or In, $Li_{7-x}PS_{6-x}Cl_x$ wherein $0<x\leq 2$, $Li_{7-x}PS_{6-x}Br_x$ wherein $0<x<2$, or $Li_{7-x}PS_{6-x}I_x$ wherein $0<x<2$. Mentioned are $Li_6PS_5Cl$, $Li_6PS_5Br$, or $Li_6PS_5I$.

The oxide solid electrolyte may comprise $Li_{1+x+y}Al_xTi_{2-x}Si_yP_{3-y}O_{12}$ wherein $0<x<2$, $0\leq y<3$, $BaTiO_3$, $Pb(Zr_{(1-x)}Ti_x)O_3$ wherein $0\leq x\leq 1$, $Pb_{1-x}La_xZr_{1-y}Ti_yO_3$ wherein $0\leq x<1$, $0\leq y<1$, $Pb(Mg_{1/3}Nb_{2/3})O_3$—$PbTiO_3$, $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, $Li_3PO_4$, $Li_xTi_y(PO_4)_3$ wherein $0<x<2$, $0<y<3$), $Li_xAl_yTi_z(PO_4)_3$, $0<x<2$, $0<y<1$, $0<z<3$), $Li_{1+x+y}(Al_{(1-m)}Ga_m)_x(Ti_{(1-n)}Ge_n)_{2-x}Si_yP_{3-y}O_{12}$ ($0\leq x\leq 1$, $0\leq y\leq 1$, $0\leq m\leq 1$, and $0\leq n\leq 1$, $Li_xLa_yTiO_3$ wherein $0<x<2$, $0<y<3$, $Li_xGe_yP_zS_w$ wherein $0<x<4$, $0<y<1$, $0<z<1$, and $0<w<5$, $Li_xN_y$ wherein $0<x<4$ and $0<y<2$, $SiS_2$, $Li_xSi_yS_z$ wherein $0<x<3$, $0<y<2$, $0<z<4$, $Li_xP_yS_z$ wherein $0<x<3$, $0<y<3$ and $0<z<7$, $Li_2O$, $LiF$, $LiOH$, $Li_2CO_3$, $LiAlO_2$, a $Li_2O$—$Al_2O_3$—$SiO_2$—$P_2O_5$—$TiO_2$—$GeO_2$ ceramic, a garnet ceramic of the formula $Li_{3+x}La_3M^1{}_2O_{12}$ wherein $M^1$ is Te, Nb or Zr and x is an integer of 1 to 10, or a combination thereof. Mentioned are $(La_{1-x}Li_x)TiO_3$ (LLTO) wherein $0<x<1$, $Li_{0.34}La_{0.51}TiO_{2.94}$, lithium titanium aluminum phosphate (LTAP, $Li_{1+x}Ti_{2-x}Al(PO_4)_3$ where $0\leq x\leq 0.4$, in which at least a part of $Ti^{4+}$ and $P^{5+}$ ions are substituted with trivalent cations, such as $Al^{3+}$, $Ga^{3+}$, $Sc^{3+}$, $In^{3+}$, and $Y^{3+}$, $Li_{4-x}M_{1-y}M'_yS_4$ where M is Si and Ge and M' are P, Al, Zn, or Ga (thio-LISICON), or a combination thereof.

Mentioned is a garnet-type oxide. The garnet-type oxide can be of the formula $Li_{5+x}E_3(Me^2{}_zMe^2{}_{(2-z)})O_d$ wherein E is a trivalent cation; $Me^1$ and $Me^2$ are each independently one of a trivalent, tetravalent, pentavalent, and a hexavalent cation; $0<x\leq 3$, $0\leq z<2$, and $0<d\leq 12$; and O can be partially or totally substituted with a pentavalent anion, a hexavalent anion, a heptavalent anion, or a combination thereof. For example, E can be partially substituted with a monovalent or divalent cation. In another embodiment, for example, in the solid ion conductor, when $0<x\leq 2.5$, E may be La and $Me^2$ can be Zr.

The garnet-type oxide can be of the formula $Li_{5+x+2y}(D_yE_{3-y})(Me^1{}_zMe^2{}_{2-z})O_d$ wherein D is a monovalent or divalent cation; E is a trivalent cation; $Me^1$ and $Me^2$ are each independently a trivalent, tetravalent, pentavalent, or a hexavalent cation; $0<x+2y\leq 3$, $0<y\leq 0.5$, $0\leq z<2$, and $0<d\leq 12$; and O can be partially or totally substituted with a pentavalent anion, a hexavalent anion, a heptavalent anion, or a combination thereof. The preferred number of moles of lithium per formula unit (Li-pfu) in the above formula is $6<(5+x+2y)<7.2$, $6.2<(5+x+2y)<7$, $6.4<(5+x+2y)<6.8$. In the garnet-type oxide of the above formulas, D can comprise potassium (K), rubidium (Rb), cesium (Cs), calcium (Ca), barium (Ba), or strontium (Sr). In an embodiment, D is calcium (Ca), barium (Ba), or strontium (Sr). In the above formulas, Me can be a transition metal. For example, Me can be tantalum (Ta), niobium (Nb), yttrium (Y), scandium (Sc), tungsten (W), molybdenum (Mo), antimony (Sb), bismuth (Bi), hafnium (Hf), vanadium (V), germanium (Ge), silicon (Si), aluminum (Al), gallium (Ga), titanium (Ti), cobalt (Co), indium (In), Zinc (Zn), or chromium (Cr). Mentioned is $Li_{6.5}La_3Zr_{1.5}Ta_{0.5}O_{12}$.

The solid electrolyte may be porous. The porous structure of the electrolyte can refer to an electrolyte having micro- and/or nanostructural features, e.g., microporosity and/or nanoporosity. For example, the porosity of the solid electrolyte can be 10% to 90%, or 20% to 80%, or 30% to 70%. Another electrolyte, e.g., the liquid electrolyte or an ionic liquid, may be disposed in a pore of the solid electrolyte.

The solid electrolyte may be in the form of glass-ceramic or ceramic. Sputtering and pulsed laser deposition (PLD) method may be used to obtain a film or layer of the solid electrolyte.

The liquid electrolyte may comprise a polar aprotic solvent and a lithium salt. The polar aprotic solvent can be dimethylether, diethylether, dimethyl carbonate, diethyl carbonate, ethylmethyl carbonate, dipropyl carbonate, methylpropyl carbonate, ethylpropyl carbonate, ethylene carbonate, propylene carbonate, butylene carbonate, fluoroethylene carbonate, methyl acetate, ethyl acetate, n-propyl acetate, dimethylacetate, methyl propionate, ethyl propionate, y-butyrolactone, decanolide, valerolactone, mevalonolactone, caprolactone, dibutyl ether, tetraglyme, diglyme, polyethylene glycol dimethylether, dimethoxy ethane, 2-methyl tetrahydrofuran, 2,2-dimethyl tetrahydrofuran, 2,5-dimethyl tetrahydrofuran, cyclohexanone, triethylamine, triphenylamine, triether phosphine oxide, acetonitrile, dimethyl formamide, 1,3-dioxolane, or sulfolane. The organic solvent is not limited thereto and any suitable solvent can be used. In an aspect, the solvent preferably comprises a carbonate ester, and more preferably comprises ethylene carbonate and propylene carbonate.

The lithium salt may comprise $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y-1}SO_2)$ in which the x and y are natural numbers, e.g., an integer of 1 to 20, LiCl, LiI, $LiB(C_2O_4)_2$, lithium bis(fluorosulfonyl)imide, or a combination thereof. The concentration of the lithium salt may be 0.1 to 2 molar (M), e.g., 0.5 to 1.3 M in the aprotic solvent.

The liquid electrolyte may comprise an ionic liquid, and the ionic liquid may be a polymeric ionic liquid. The ionic liquid may include a cation and an anion. The cation may comprise an ammonium-based cation, a pyrrolidinium-based cation, a pyridinium-based cation, pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, or a triazole-based cation. The anion may comprise $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $SO_4^-$, $CF_3SO_3^-$, $(C_2F_5SO_2)_2N^-$, $(C_2F_5SO_2)(CF_3SO_2)N^-$, $NO_3^-$, $Al_2Cl_7^-$, $CF_3COO^-$, $CH_3COO^-$, $CF_3SO_3^-$, $(CF_3SO_2)_3C^-$, $(CF_3CF_2SO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or $(CF_3SO_2)_2N^-$. For example, the polymeric ionic liquid may comprise poly(diallyldimethyl ammonium) (TFSI), poly(l-allyl-3-methyl imidazolium trifluoromethane sulfonylimide), or poly((N-methyl-N-propylpiperidinium bis(trifluoromethane sulfonyl)imide)).

The electrolyte may comprise polyethylene oxide (PEO), polyvinyl alcohol (PVA), polyvinyl pyrrolidone (PVP), polysulfone, polypropylene oxide (PPO), polymethyl methacrylate, polyethyl methacrylate, polydimethyl siloxane, polyacrylic acid, polymethacrylic acid, polymethyl acrylate, polyethyl acrylate, poly(2-ethylhexyl acrylate), polybutyl methacrylate, poly (2-ethylhexyl methacrylate), polydecyl acrylate, polyethylene vinylacetate, a phosphate ester polymer, polyester sulfide, polyvinylidene fluoride (PVdF), or Li-substituted NAFION. However, the disclosed electrolyte is not limited thereto, and any suitable material may be used.

The solid electrolyte may be used as a separator, or a microporous separator may be included between the positive electrode and negative electrode. In an aspect the compound of Formula 1 may be disposed on a surface of the microporous separator material. In an aspect, the separator may comprise the compound of Formula 1 in combination with another lithium conductive material to provide a separator comprising the compound of Formula 1 and the lithium conductive material. In an aspect, the separator comprises a glass fiber, polyester, polyethylene, polypropylene, polytetrafluoroethylene (PTFE), or a combination thereof. In an aspect the separator comprises a microporous polyolefin film, such as microporous polyethylene or polypropylene, and the compound of Formula 1 disposed thereon. A diameter of a pore of the microporous separator can be 0.01 micrometers (μm) to 10 μm, and a thickness of the separator can be in a range of 5 nm to 100 μm. For example, a porous separator comprising the compound of Formula 1 may have a pore size of 1 nm to 50 μm, 20 nm to 25 μm, or 100 nm to 5 μm. The solid-state electrolyte may be liquid-impermeable, may be non-porous, or may have a pore size of 0.01 μm to 1 μm, or 0.05 μm to 0.5 μm. In an aspect, the separator comprising the compound of Formula 1 may be porous.

To manufacture a battery, an electrolyte, and optionally a separator, may be provided between a positive electrode and the negative electrode. The positive electrode, the negative electrode, and electrolyte, may each independently comprise the compound of Formula 1. The battery may be a lithium battery, and may be a lithium ion battery.

The solid electrolyte may include a solid electrolyte material having the composition of Formula 1. The solid electrolyte may be suitable for use as an electrolyte in a battery, such as a lithium battery. A lithium battery including a solid electrolyte may include but are not limited to a lithium battery including a liquid electrolyte, an all-solid-state lithium battery, a lithium-air battery, or a capacitor. Any electrochemical device including a solid electrolyte and capable of being used as an electrochemical device, may be used.

Also disclosed is a composition comprising the compound of claim 1; and a solvent, a binder, or a combination thereof. The composition may be suitable for providing a layer comprising the compound of Formula 1, by coating, for example. The solvent may comprise N-methyl-2-pyrrolidone, acetonitrile, tetrahydrofuran, acetone, methyl ethyl ketone, 1,4-dioxane, ethylene glycol dimethyl ether. The binder may be as disclosed above.

The positive electrode may be prepared by forming a positive active material layer comprising a positive active material on a current collector. The positive active material layer may be prepared by screen printing, slurry casting, or a powder compression method. Any suitable method may be used.

The negative electrode may also be prepared by screen printing, slurry casting, or a powder compression method. Any suitable method may be used.

Also disclosed is a method of preparing a lithium-ion conductor, the method comprising: providing an element A precursor, a Li precursor, a P precursor, a Zn precursor, and a S precursor; contacting the element A precursor, the Li precursor, the P precursor, the Zn precursor, and the S precursor to prepare a mixture; and heat-treating the mixture to prepare the compound of Formula 1

$$Li_{1+2x-y}Zn_{1-x}PS_{4-y-\delta}A_y \quad (1)$$

wherein A is halogen, 0≤x≤1, 0≤y≤0.5, and 0≤δ≤0.5.

The precursor comprising Li, Zn, P, and S, and element A may each independently be provided in the form of a neutral compound or a salt. Use of an acetate, carbonate, hydroxide, oxide, sulfate, or phosphate, or a combination thereof, is mentioned. For example, the precursor comprising lithium may be lithium hydroxide, lithium carbonate, lithium acetate, or a combination thereof. The precursor comprising Zn may comprise an acetate, hydroxide, oxide, or carbonate of Zn, or a combination thereof. The element A precursor may be any suitable compound comprising element A, such as LiF, LiCl, LiBr, LiI, LiAt, or a combination thereof. The Li precursor, Zn precursor, P precursor, the S precursor, and the element A precursor each independently may be a same precursor. Use of $Li_2S$, LiCl, $P_2S_5$, ZnS, and $Li_3PS_4$ are mentioned. Providing of the Li precursor, Zn precursor, P precursor, the S precursor, and the element A precursor may comprise purchasing the precursor. If desired, the providing of the precursor may comprise drying, e.g., heat-treating at 50° C. to 200° C., or 60° C. to 150° C. The drying may comprise contacting with a gas such as dry air (e.g., air having a dewpoint of less than 10° C., e.g., 0° C. to 10° C.), argon, nitrogen, or helium.

The contacting of the element A precursor, the Li precursor, the P precursor, the Zn precursor, and the S precursor to prepare a mixture may comprise mixing, grinding, stirring, ball-milling, or a combination thereof.

The heat-treating of the mixture to prepare the compound of Formula 1 may comprise heat-treating at 200° C. to 500° C., 220° C. to 475° C., 240° C. to 450° C., or 250° C. to 425° C. The heat-treating may comprise heat-treating for 1 hour (h) to 50 h, 2 h to 40 h, or 4 h to 30 h.

The heat-treating may comprise a first heat-treating and a second heat-treating. The first heat-treating and the second heat-treating may each intimately comprise heat treating at 200° C. to 500° C., 220° C. to 475° C., 240° C. to 450° C., or 250° C. to 425° C. The first heat-treating and the second heat-treating may each independently comprise heat-treating for 1 hour (h) to 50 h, 2 h to 40 h, or 4 h to 30 h.

In aspect, the second heat-treating comprises heat-treating a product of the first heat-treating. The product of the first heat-treating may be compressed to form a pellet, for example. The compression may comprise compression with an applied pressure of 200 megaPascals (MPa) to 500 MPa, 250 MPa to 450 MPa, or 300 MPa to 400 MPa.

Also, the mixture of the element A precursor, the Li precursor, the P precursor, the Zn precursor, and the S precursor may be disposed on the product of the first heat-treating. While not wanting to be bound by theory, it is believed that by providing the mixture of the element A precursor, the Li precursor, the P precursor, the Zn precursor, and the S precursor on the product of the first heat-treating during the second heat-treating, volatilization of a precursor, e.g., lithium nitrate, during the second heat-treating is reduced, resulting in a product having the reduced impurity composition from the second heat-treating. The compound on Formula 1 may be prepared in various forms, such as a powder, a film, or pellet.

Reference are made in detail to an embodiment, examples of which are illustrated in the accompanying drawings, wherein like reference numerals refer to like elements throughout. In this regard, the disclosed embodiment may have different forms and should not be construed as being limited to the description set forth herein.

In the present specification, when a portion "includes" an element, another element may be further included, rather than excluding the existence of the other element, unless otherwise described.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

All values and ranges are understood to be inclusive of the stated value and a range dictated by context, e.g., a degree of error associated with measurement of the particular quantity, or a tolerance in manufacture.

Unless otherwise defined, all terms (including technical and scientific terms) used herein have the same meaning as understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

EXAMPLES

Preparation of Solid Electrolyte Material

Example 1: Preparation of $Li_{2.4}Zn_{0.25}PS_{3.9}Cl_{0.1}$

LiCl (purchased from Sigma-Aldrich) is dried at 200° C. for 2 hours (h) under vacuum to provide vacuum dried LiCl.

Nano-sized ZnS is prepared via chemical precipitation. 100 milliliters (mL) 0.1 mole (M) $Zn(CH_3COO)_2$ and 100 mL of 0.1 M $Na_2S$ are mixed drop by drop and stirred for 3 hours (h), to prepare a white precipitate, then the white precipitate is filtered and washed with water and ethanol 3 times, respectively, and then dried under vacuum to prepare nano-sized ZnS. Next, $Li_2S$, $P_2S_5$ (both, purchased from Sigma-Aldrich), nano-sized ZnS, and the vacuum dried LiCl, which are used as starting materials, are combined in a Li:Zn:P:S:Cl molar ratio of 2.4:0.25:1:3.9:0.1, and then mixed together using an agate motor/pestle to provide a uniform light-yellow mixture. 0.5 gram (g) of the mixture is added to a 45 mL zirconia ($ZrO_2$) container, and zirconia balls are added thereto. The mixture is milled by a planetary ball milling for 20 hours at a rotation speed of 400 rpm. The resulting intermediate is ground again for 10 minutes using agate motor/pestle and pressed into a 6-millimeters (mm) pellet under the pressure of 400 MPa to provide a 50 milligrams (mg) pellet having the thickness of 1 mm. The pellet is then subjected to heat treatment at a temperature of 260° C. for 12 hours before being allowed to cool to room temperature to provide $Li_{2.4}Zn_{0.25}PS_{3.9}Cl_{0.1}$.

Example 2: Preparation of $Li_{2.4375}Zn_{0.25}PS_{3.9375}Cl_{0.0625}$

A solid electrolyte material having a composition $Li_{2.4375}Zn_{0.25}PS_{3.9375}Cl_{0.0625}$ is prepared in the same manner as in Example 1, except that the ratio of $Li_2S$, $P_2S_5$, nano-sized ZnS, and LiCl are combined in a Li:Zn:P:S:Cl molar ratio of 2.4375:0.25:1:3.9375:0.0625 to prepare $Li_{2.4375}Zn_{0.25}PS_{3.9375}Cl_{0.0625}$.

Example 3: Preparation of $Li_{2.375}Zn_{0.25}PS_{3.875}Cl_{0.125}$ $Li_{2.375}Zn_{0.25}PS_{3.875}Cl_{0.125}$ is prepared in the same manner as in Example 1, except that the ratio of $Li_2S$, $P_2S_5$, nano-sized ZnS, and LiCl are combined in a Li:Zn:P:S:Cl molar ratio of 2.375:0.25:1:3.875:0.125 to provide $Li_{2.375}Zn_{0.25}PS_{3.875}Cl_{0.125}$.

Example 4: Preparation of $Li_{2.3125}Zn_{0.25}PS_{3.8125}Cl_{0.1875}$ $Li_{2.3125}Zn_{0.25}PS_{3.8125}Cl_{0.1875}$ is prepared in the same manner as in Example 1, that the ratio of $Li_2S$, $P_2S_5$, nano-sized ZnS, and LiCl are combined in a Li:Zn:P:S:Cl molar ratio of 2.3125:0.25:1:3.8125:0.1875 to prepare $Li_{2.3125}Zn_{0.25}PS_{3.8125}Cl_{0.1875}$.

Example 5: Preparation of $Li_{2.25}Zn_{0.25}PS_{3.75}Cl_{0.25}$ $Li_{2.25}Zn_{0.25}PS_{3.75}Cl_{0.25}$ is prepared in the same manner as in Example 1, except that the ratio of $Li_2S$, $P_2S_5$, nano-sized ZnS, and LiCl are combined in a Li:Zn:P:S:Cl molar ratio of 2.25:0.25:1:3.75:0.25 to provide $Li_{2.25}Zn_{0.25}PS_{3.75}Cl_{0.25}$.

Example 6: Preparation of $Li_{2.4375}Zn_{0.25}PS_{3.9375}Br_{0.0625}$ $Li_{2.4375}Zn_{0.25}PS_{3.9375}Br_{0.0625}$ is prepared in the same manner as in Example 1, except that LiBr is used instead of LiCl and the ratio of $Li_2S$, $P_2S_5$, nano-sized ZnS, and LiBr are combined in a Li:Zn:P:S:Br molar ratio of 2.4375:0.25:1:3.9375:0.0625 to provide $Li_{2.4375}Zn_{0.25}PS_{3.9375}Br_{0.0625}$.

Example 7: Preparation of $Li_{2.4}Zn_{0.25}PS_{3.9}Br_{0.1}$ $Li_{2.4}Zn_{0.25}PS_{3.9}Br_{0.1}$ is prepared in the same manner as in Example 1, except that LiBr is used instead of LiCl and the ratio of $Li_2S$, $P_2S_5$, nano-sized ZnS, and LiBr are combined in a Li:Zn:P:S:Br molar ratio of 2.4:0.25:1:3.9:0.1 to provide $Li_{2.4}Zn_{0.25}PS_{3.9}Br_{0.1}$.

Example 8: Preparation of $Li_{2.375}Zn_{0.25}PS_{3.875}Br_{0.125}$ $Li_{2.375}Zn_{0.25}PS_{3.875}Br_{0.125}$ is prepared in the same manner as in Example 1, except that LiBr is used instead of LiCl and the ratio of $Li_2S$, $P_2S_5$, nano-sized ZnS, and LiBr are combined in a Li:Zn:P:S:Br molar ratio of 2.375:0.25:1:3.875:0.125 to provide $Li_{2.375}Zn_{0.25}PS_{3.875}Br_{0.125}$.

Example 9: Preparation of $Li_{2.3125}Zn_{0.25}PS_{3.8125}Br_{0.1875}$ $Li_{2.3125}Zn_{0.25}PS_{3.8125}Br_{0.1875}$ is prepared in the same manner as in Example 1, except that LiBr is used instead of LiCl and the ratio of $Li_2S$, $P_2S_5$, nano-sized ZnS, and LiBr are combined in a Li:Zn:P:S:Br molar ratio of 2.3125:0.25:1:3.8125:0.1875 to provide $Li_{2.3125}Zn_{0.25}PS_{3.8125}Br_{0.1875}$.

Example 10: Preparation of $Li_{2.25}Zn_{0.25}PS_{3.75}Br_{0.25}$ $Li_{2.25}Zn_{0.25}PS_{3.75}Br_{0.25}$ is prepared in the same manner as in Example 1, except that LiBr is used instead of LiCl and the ratio of $Li_2S$, $P_2S_5$, nano-sized ZnS, and LiBr are combined in a Li:Zn:P:S:Br molar ratio of 2.25:0.25:1:3.75:0.25 to provide $Li_{2.25}Zn_{0.25}PS_{3.75}Br_{0.25}$.

Example 11: Preparation of $Li_{2.4375}Zn_{0.25}PS_{3.9375}I_{0.0625}$ $Li_{2.4375}Zn_{0.25}PS_{3.9375}I_{0.0625}$ is prepared in the same manner as in Example 1, except that LiI is used instead of LiCl and the ratio of $Li_2S$, $P_2S_5$, nano-sized ZnS, and LiI are combined in a Li:Zn:P:S:I molar ratio of 2.4375:0.25:1:3.9375:0.0625 to provide $Li_{2.4375}Zn_{0.25}PS_{3.9375}I_{0.0625}$.

Example 12: Preparation of $Li_{2.375}Zn_{0.25}PS_{3.875}I_{0.125}$ $Li_{2.375}Zn_{0.25}PS_{3.875}I_{0.125}$ is prepared in the same manner as in Example 1, except that LiI is used instead of LiCl and the ratio of $Li_2S$, $P_2S_5$, nano-sized ZnS, and LiI are combined in a Li:Zn:P:S:I molar ratio of 2.375:0.25:1:3.875:0.125 to provide $Li_{2.375}Zn_{0.25}PS_{3.875}I_{0.125}$.

Example 13: Preparation of $Li_{2.3125}Zn_{0.25}PS_{3.8125}I_{0.1875}$ $Li_{2.3125}Zn_{0.25}PS_{3.8125}I_{0.1875}$ is prepared in the same manner as in Example 1, except that LiI is used instead of LiCl and the ratio of $Li_2S$, $P_2S_5$, nano-sized ZnS, and LiI are combined in Li:Zn:P:S:I molar ratio of 2.3175:0.25:1:3.8125:0.1875 to provide $Li_{2.3125}Zn_{0.25}PS_{3.8125}I_{0.1875}$.

Example 14: Preparation of $Li_{2.25}Zn_{0.25}PS_{3.75}I_{0.25}$ $Li_{2.25}Zn_{0.25}PS_{3.75}I_{0.25}$ is prepared in the same manner as in Example 1, except that LiI is used instead of LiCl and the ratio of $Li_2S$, $P_2S_5$, nano-sized ZnS, and LiI are combined in a Li:Zn:P:S:I molar ratio of 2.25:0.25:1:3.75:0.25 to provide $Li_{2.25}Zn_{0.25}PS_{3.75}I_{0.25}$.

Example 15: Preparation of $Li_{2.4}Zn_{0.25}PS_{3.9}Cl_{0.1}$ $Li_{2.4}Zn_{0.25}PS_{3.9}Cl_{0.1}$ is prepared in the same manner as in Example 1, except that after heat treatment at a temperature of 260° C. for 12 hours and a cooling to room temperature to provide a first heat-treated product, the first heat-treated product is pressed into a pellet under a pressure of 2 megaPascals (MPa), and the pellet covered with a mixture having the composition of the mixture used to provide the first heat-treated product, i.e., the mixture of $Li_2S$, $P_2S_5$, nano-sized ZnS, and LiCl in a Li:Zn:P:S:Cl molar ratio of 2.4:0.25:1:3.9:0.1. The covered pellet is heat-treated at a temperature of 260° C. for 12 hours to provide a second heat treated product, $Li_{2.4}Zn_{0.25}PS_{3.9}Cl_{0.1}$.

Example 16: Preparation of $Li_{2.4}Zn_{0.25}PS_{3.9}Cl_{0.1}$ $Li_{2.4}Zn_{0.25}PS_{3.9}Cl_{0.1}$ is prepared in the same manner as in Example 15, except that the pellet is pressed to a pressure of 5 MPa instead of 2 MPa.

Comparative Example 1: Preparation of $Li_{2.5}Zn_{0.25}PS_4$ $Li_2S$, $P_2S_5$, and ZnS are combined in a molar ratio of 5:2:1. 1.5 g of the mixture is added to a 45 mL zirconia ($ZrO_2$) container, and zirconia balls are added thereto. The mixture is subjected to a planetary ball milling process for 16 hours and 40 minutes at a rotation speed of 400 rpm. The resulting intermediate is sealed under vacuum in quartz tube, heat treated at a temperature of 220° C. for 12 hours, and then cooled to obtain $Li_{2.5}Zn_{0.25}PS_4$ in the form of a powder.

Comparative Examples 2 and 3: Preparation of $Li_2Zn_{0.5}PS_4$ and $Li_{2.7}Zn_{0.15}PS_4$ Mixtures having a composition $Li_2Zn_{0.5}PS_4$ (Comparative Example 2) and a composition of $Li_{2.7}Zn_{0.15}PS_4$ (Comparative Example 3) are prepared in the same manner as in Example 1, except that the molar ratio of the starting materials $Li_2S$, $P_2S_5$, and ZnS is 2:1:1 for Comparative Example 2 and 27:10:3 for Comparative Example 3.

Table 1 lists $Li_{1+2x-y}Zn_{1-x}PS_{4-y}A_y$ (x=0.75) materials evaluated with different dopants (A=Cl, Br, and I; y=0.0625, 0.1, 0.125, 0.1875, 0.25). The energy above hull in millielectronvolt per atom (meV/atom) is a measure of the energy penalty paid to dope the structure.

TABLE 1

| Example | Composition | Energy above hull (meV/atom) | Decomposition product |
|---|---|---|---|
| Comparative Example 1 | $Li_{2.5}Zn_{0.25}PS_4$ | 6 | $Li_3PS_4$ $LiZnPS_4$ |
| Example 1 | $Li_{2.4}Zn_{0.25}PS_{3.9}Cl_{0.1}$ | N/A | $Li_3PS_4$, $LiZnPS_4$, $LiCl$, $P_2S_5$ |
| Example 2 | $Li_{2.4375}Zn_{0.25}PS_{3.9375}Cl_{0.0625}$ | 14.0 | $Li_3PS_4$, $LiZnPS_4$, $LiCl$, $P_2S_5$ |
| Example 3 | $Li_{2.375}Zn_{0.25}PS_{3.875}Cl_{0.125}$ | 20.3 | $Li_3PS_4$, $LiZnPS_4$, $LiCl$, $P_2S_5$ |
| Example 4 | $Li_{2.3125}Zn_{0.25}PS_{3.8125}Cl_{0.1875}$ | 26.7 | $Li_3PS_4$, $LiZnPS_4$, $LiCl$, $P_2S_5$ |
| Example 5 | $Li_{2.25}Zn_{0.25}PS_{3.75}Cl_{0.25}$ | 34.2 | $Li_3PS_4$, $LiZnPS_4$, $LiCl$, $P_2S_5$ |
| Example 6 | $Li_{2.4375}Zn_{0.25}PS_{3.9375}Br_{0.0625}$ | 13.5 | $LiZnPS_4$, $Li_3PS_4$, $P_2S_5$, $LiBr$ |
| Example 7 | $Li_{2.4}Zn_{0.25}PS_{3.9}Br_{0.1}$ | 19.4 | $LiZnPS_4$, $Li_3PS_4$, $P_2S_5$, $LiBr$ |
| Example 8 | $Li_{2.375}Zn_{0.25}PS_{3.875}Br_{0.125}$ | 19.4 | $LiZnPS_4$, $Li_3PS_4$, $P_2S_5$, $LiBr$ |
| Example 9 | $Li_{2.3125}Zn_{0.25}PS_{3.8125}Br_{0.1875}$ | 25.2 | $LiZnPS_4$, $Li_3PS_4$, $P_2S_5$, $LiBr$ |
| Example 10 | $Li_{2.25}Zn_{0.25}PS_{3.75}Br_{0.25}$ | 32.1 | $LiZnPS_4$, $Li_3PS_4$, $P_2S_5$, $LiBr$ |
| Example 11 | $Li_{2.4375}Zn_{0.25}PS_{3.9375}I_{0.0625}$ | 12.4 | $LiZnPS_4$, $Li_3PS_4$, $LiI$, $P_2S_5$ |
| Example 12 | $Li_{2.375}Zn_{0.25}PS_{3.875}I_{0.125}$ | 17.6 | $LiZnPS_4$, $Li_3PS_4$, $LiI$, $P_2S_5$ |
| Example 13 | $Li_{2.3125}Zn_{0.25}PS_{3.8125}I_{0.1875}$ | 22.2 | $LiZnPS_4$, $Li_3PS_4$, $LiI$, $P_2S_5$ |
| Example 14 | $Li_{2.25}Zn_{0.25}PS_{3.75}I_{0.25}$ | 28.6 | $LiZnPS_4$, $Li_3PS_4$, $LiI$, $P_2S_5$ |

Evaluation of Solid Electrolyte Material
X-Ray Powder Diffraction Analysis of Example 1 and Comparative Example 1

Figure 7:
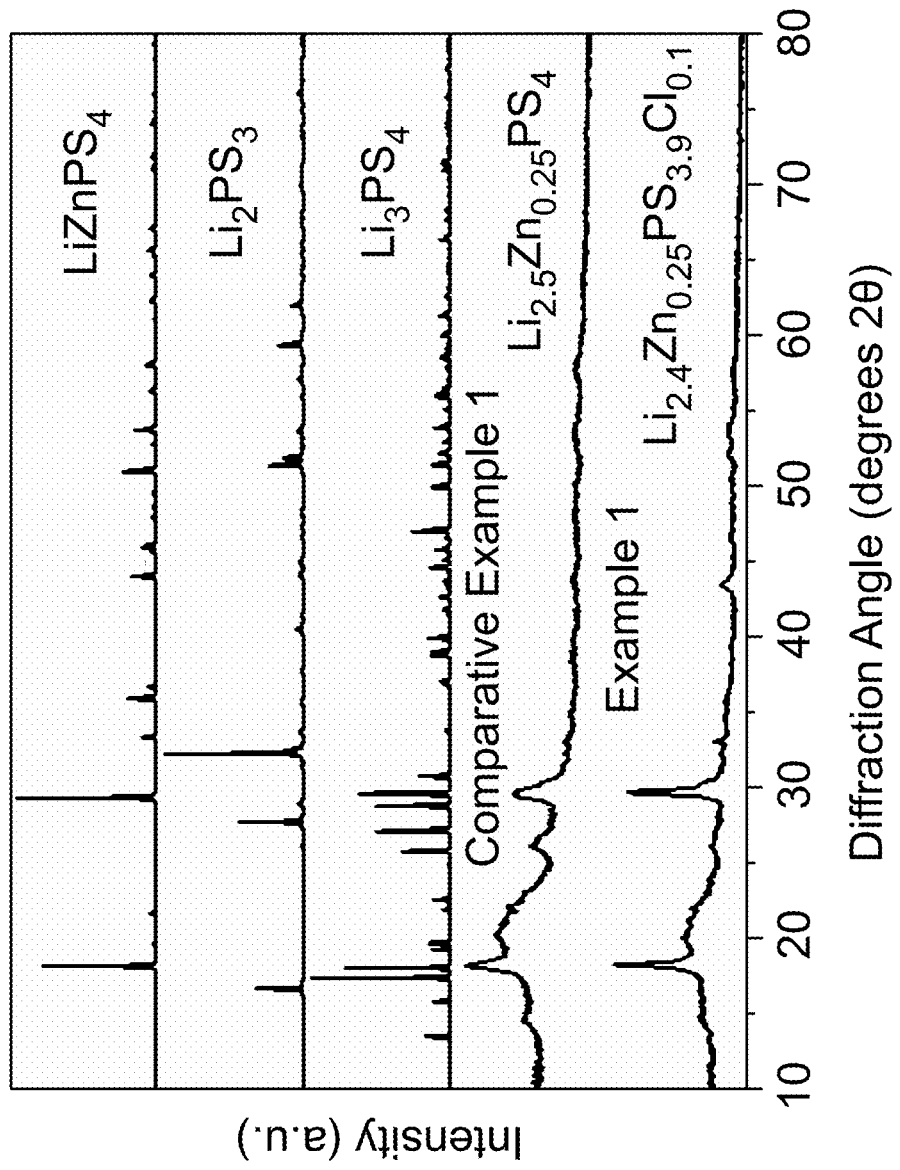
FIG. 7 is a graph of intensity (arbitrary units, a.u.) versus diffraction angle (degrees 2-theta) showing the results of X-Ray diffraction analysis (XRD) of Comparative Example 1 ($Li_{2.5}Zn_{0.25}PS_4$) and Example 1 ($Li_{2.4}Zn_{0.25}PS_{3.9}Cl_{0.1}$) using Cu Kα radiation.

The X-Ray powder diffraction (XRD) spectra obtained for $Li_{2.4}Zn_{0.25}PS_{3.9}Cl_{0.1}$ (Example 1) and $Li_{2.5}Zn_{0.25}PS_4$ (Comparative Example 1), and reference patterns for $LiZnPS_4$, $Li_3PS_4$, and $Li_2PS_3$ are shown in FIG. 7. As shown in FIG. 7, the product of Comparative Example 1 contained $Li_3PS_4$, as evidenced by the peak at 25° (2θ), for example. The product of Example 1 is more crystalline that the product of Comparative Example 1, as evidenced by the sharper peaks. Also, the intensity of the peaks attributed to $Li_3PS_4$ are reduced, indicating that the content of $Li_3PS_4$ is reduced in Example 1 relative to Comparative Example 1.

Impedance Analysis

Samples for impedance analysis were prepared by pressing 200 milligrams (mg) in a cylindrical die having a diameter of 13 mm a pressure of 4 tons to provide a pellet having a thickness of 1.0 mm. Indium gold foil having a diameter of 13 mm and a thickness of 50 μm is pressed on to both sides of the pellet by applying a pressure of 1 ton thereto.

Figure 8:
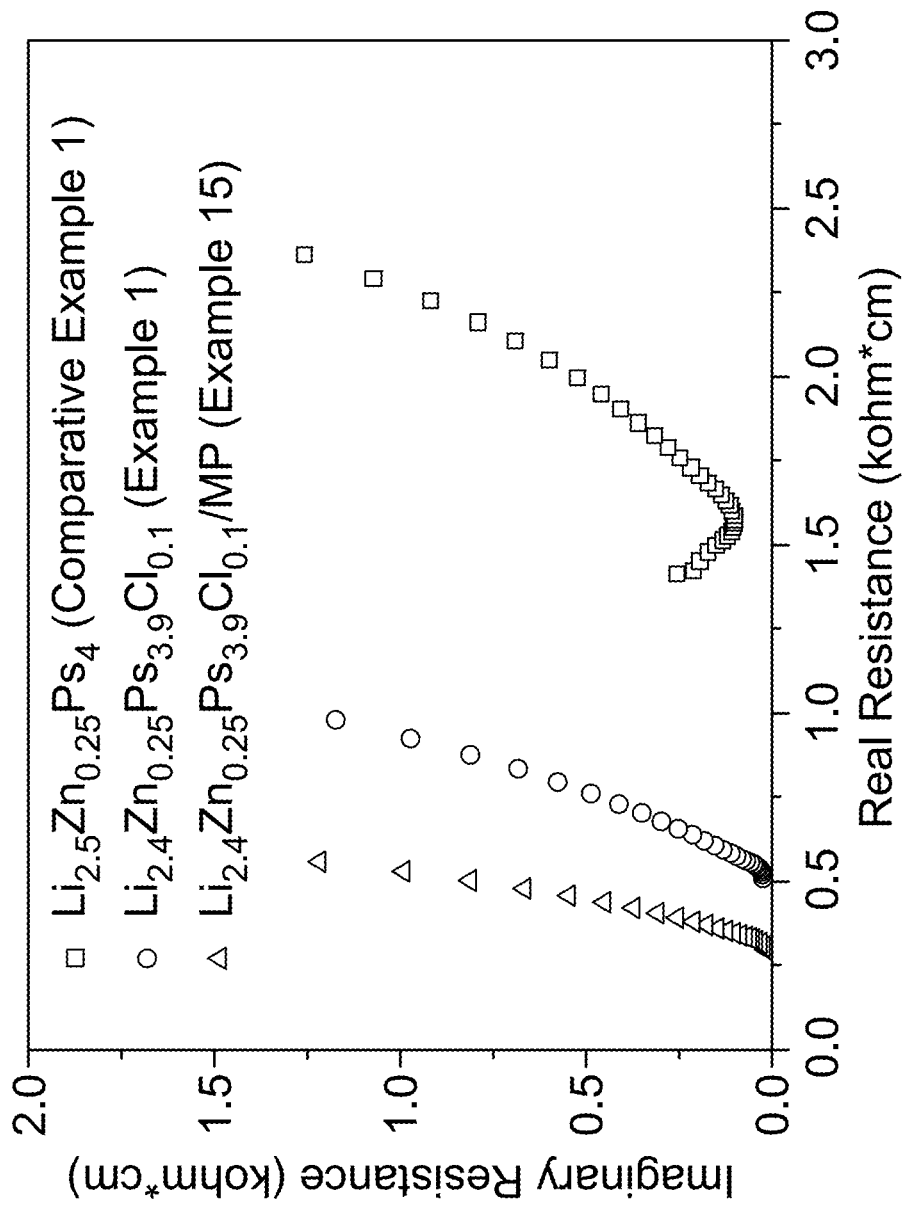
FIG. 8 is a graph of imaginary resistance (Z", kilo-ohm centimeters, kΩcm) versus real resistance (Z', kΩcm) showing the results of AC impedance analysis of Comparative Example 1, Example 1, and Example 15.

FIG. 8 is a graph of imaginary impedance (Z", kiloohm-centimeters, kΩcm) versus real impedance (Z', kΩcm) showing the results of the AC impedance analysis of the products of Comparative Example 1 ($Li_{2.5}Zn_{0.25}PS_4$), and Example 1 and Example 15 (both $Li_{2.4}Zn_{0.25}PS_{3.9}Cl_{0.1}$), at 21° C. These results show that the conductivity of $Li_{2.4}Zn_{0.25}PS_{3.9}Cl_{0.1}$ is improved relative to $Li_{2.5}Zn_{0.25}PS_4$. While not wanting to be bound by theory, it is understood that the improved conductivity is a result of improved crystallinity, and reduced impurity content. The improvement resulting from reduced impurity content is illustrated by the improved conductivity of Example 15 relative to Example 1.

$^6$Li NMR Analysis

Figure 9:
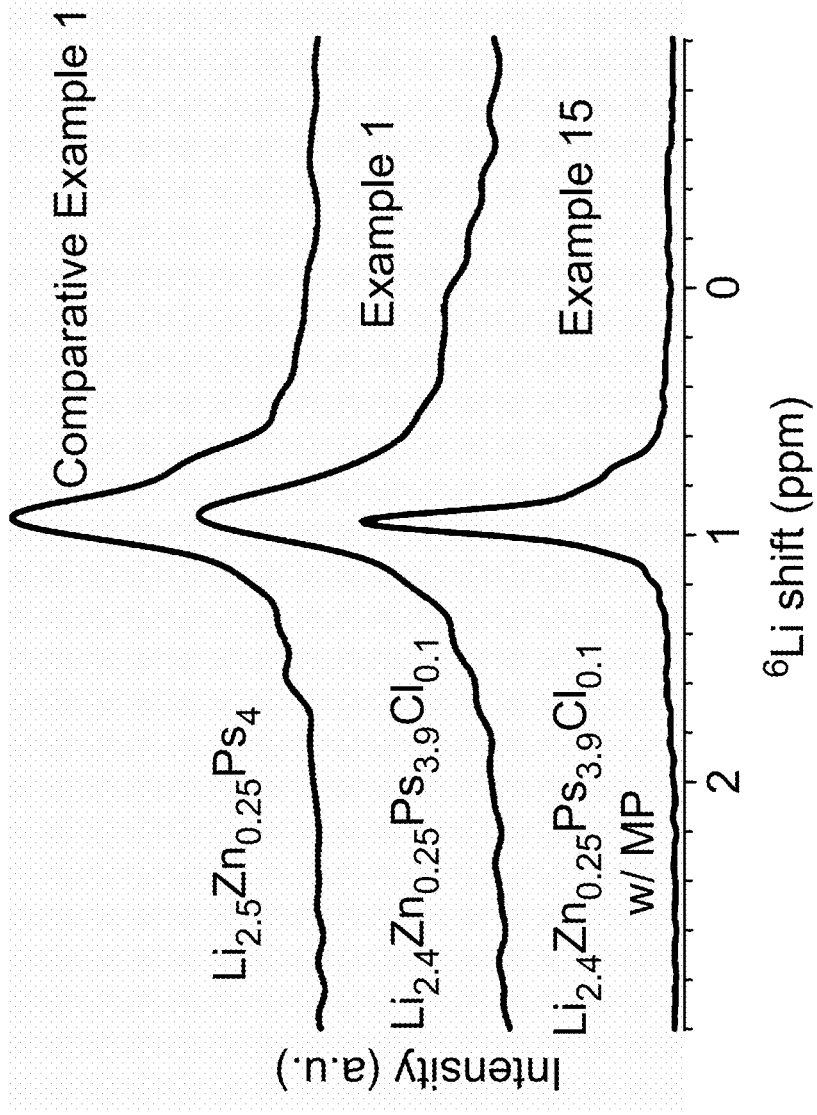
FIG. 9 is a graph of intensity (a.u.) versus chemical shift (ppm versus LiCl at −1.1 ppm) showing the results of $^6$Li NMR analysis of Comparative Example 1, Example 1, and Example 15.

FIG. 9 shows the results of $^6$Li NMR analysis of Comparative Example 1 and Examples 1 and 15. The $^6$Li peak for the product of Example 15 is narrower than that of Example 1, and the $^6$Li peak for the product of Example 1 is narrower than the $^6$Li peak for the product of Comparative Example 1. Also, the $^7$Li relaxation time ($T_1$) for each material is provided in Table 2. The $^7$Li relaxation time for Example 15 is less than Example 1, and $^7$Li relaxation time for the Example 1 is less than Comparative Example 1. While not wanting to be bound by theory, it is understood that the narrower $^6$Li NMR peak width and the shorter $^7$Li relaxation time are both driven by dipolar couplings and these interactions are partially averaged out by fast ion motion in solid electrolytes, and thus faster ion motion correlates with a narrower $^6$Li NMR peak and a shorter $T_1$ time. Also, because the products of Comparative Example 1 and Examples 1 and 15 share comparable Li distributions, and because the relaxation time in Example 1 is less than Comparative Example 1, it is believed that the inclusion of Cl results in Li vacancies, improving ion motion.

TABLE 2

| $^7$Li Relaxation Time | |
|---|---|
| Example | $T_1$ (seconds) |
| Comparative Example 1 | 1.018 |
| Example 1 | 0.985 |
| Example 15 | 0.838 |

$^{31}$P Nuclear Magnetic Resonance (NMR) Analysis

Figure 11A:
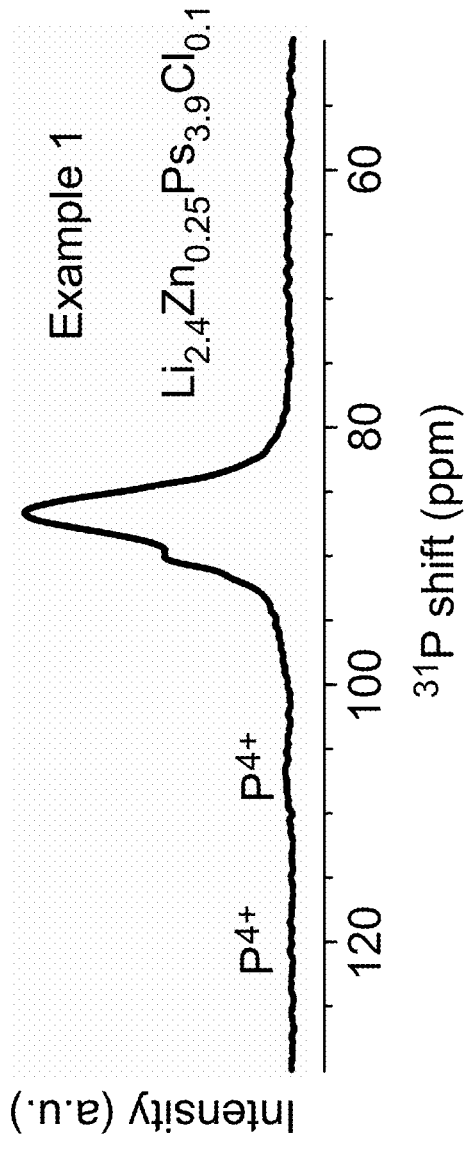
FIG. 11A is a graph of intensity (a.u.) versus chemical shift (ppm versus $Li_3PO_4$ at 0 ppm) showing the results of $^{31}$P NMR analysis of Example 1.
Figure 11B:
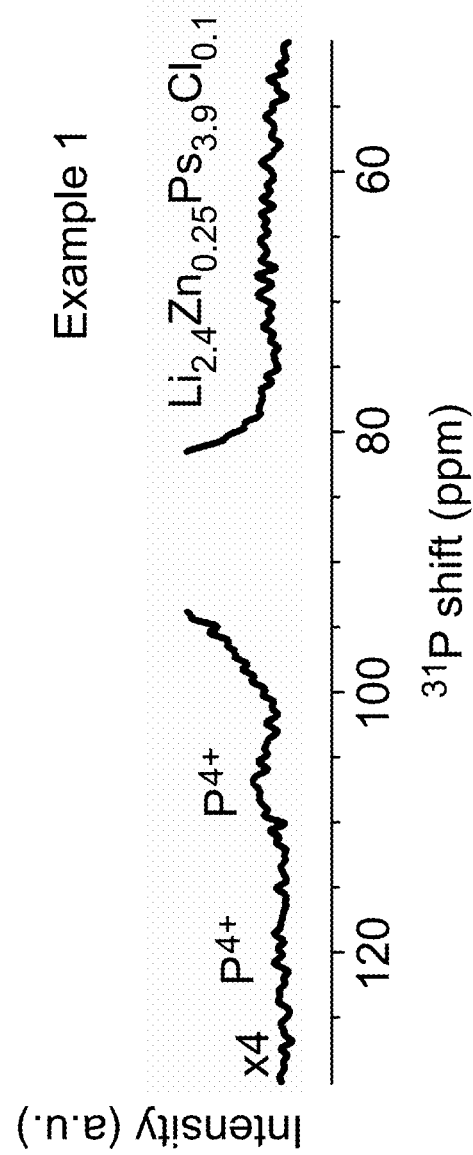
FIG. 11B is an expanded view of FIG. 11A.
Figure 12A:
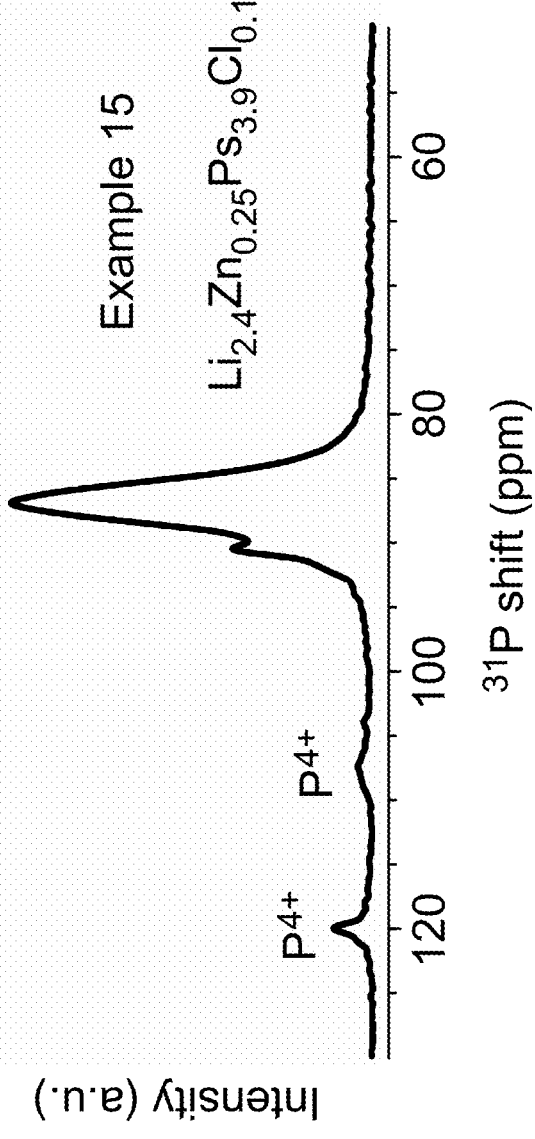
FIG. 12A is a graph of intensity (a.u.) versus chemical shift (ppm versus $Li_3PO_4$ at 0 ppm) showing the results of $^{31}$P NMR analysis of Example 15.
Figure 12B:
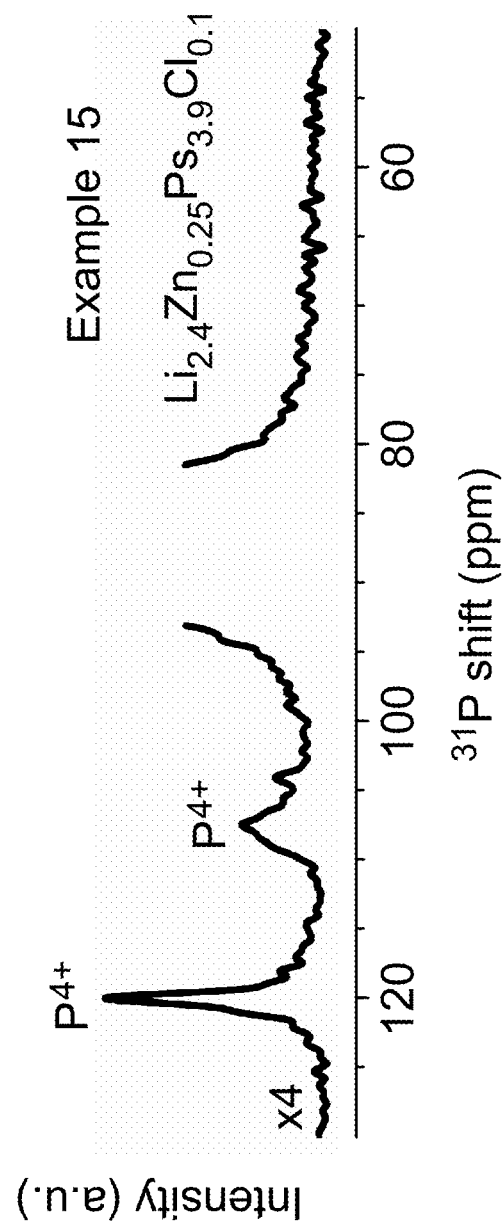
FIG. 12B is an expanded view of FIG. 12A.

The results of $^{31}$P NMR analysis of Comparative Example 1 are shown in FIG. 10A and FIG. 10B, the results of $^{31}$P NMR analysis of Example 1 are shown in FIG. 11A and FIG. 11B, and the results of $^{31}$P NMR analysis of Example 15 are shown in FIGS. 12A and 12B. FIGS. 10B, 11B, and 12B show an expanded view of the results shown in FIGS. 10A, 11A, and 12A, respectively.

The $^{31}$P NMR of Comparative Example 1 in FIGS. 10A and 10B shows a resonance at 87 parts per million (ppm), which is understood to occur from $PS_4^{3-}$ in $Li_{2.5}Zn_{0.25}PS_4$. As shown in FIGS. 11A and 11B, when a 2.5% Cl is included, in addition to the peak assigned to $PS_4^{3-}$ in $Li_{2.4}Zn_{0.25}PS_{3.9}Cl_{0.1}$ of Example 1, $P^{4+}$ 105 ppm to 111 ppm is observed. As shown in FIGS. 12A to 12B, the $^{31}$P NMR results for the $Li_{2.4}Zn_{0.25}PS_{3.9}Cl_{0.1}$ of Example 15, show a $P^{4+}$ resonance including a first resonance at 105 ppm to 111 ppm, and a second resonance at 120 ppm, in addition to the $P^{5+}$ resonance assigned to $PS_4^{3-}$ in $Li_{2.4}Zn_{0.25}PS_{3.9}Cl_{0.1}$ at 87 ppm. While not wanting to be bound by theory, the appearance of $P^{4+}$ environments in Examples 1 and 15 suggest that charge compensation occurs, due to the loss of S, and thus the oxidation state of P changes from 5+ to 4+, which helps the Cl replace S in $Li_{2.5}Zn_{0.25}PS_4$.

Activation Energy and Conductivity by AC Impedance Analysis

Figure 13:
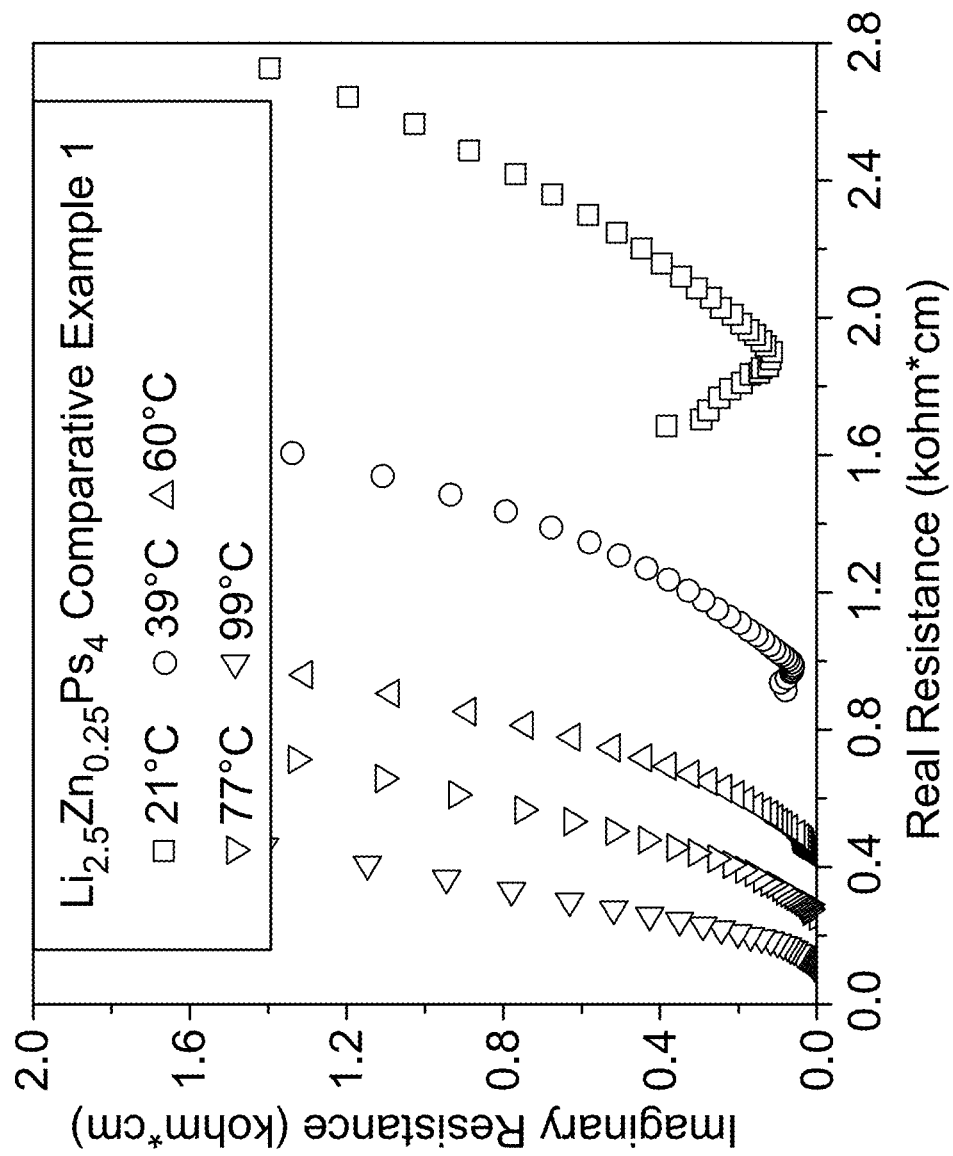
FIG. 13 is a graph of imaginary resistance (Z", kilo-ohm centimeters, kΩcm) versus real resistance (Z', kΩcm) showing the results of AC impedance analysis of Comparative Example 1.
Figure 14:
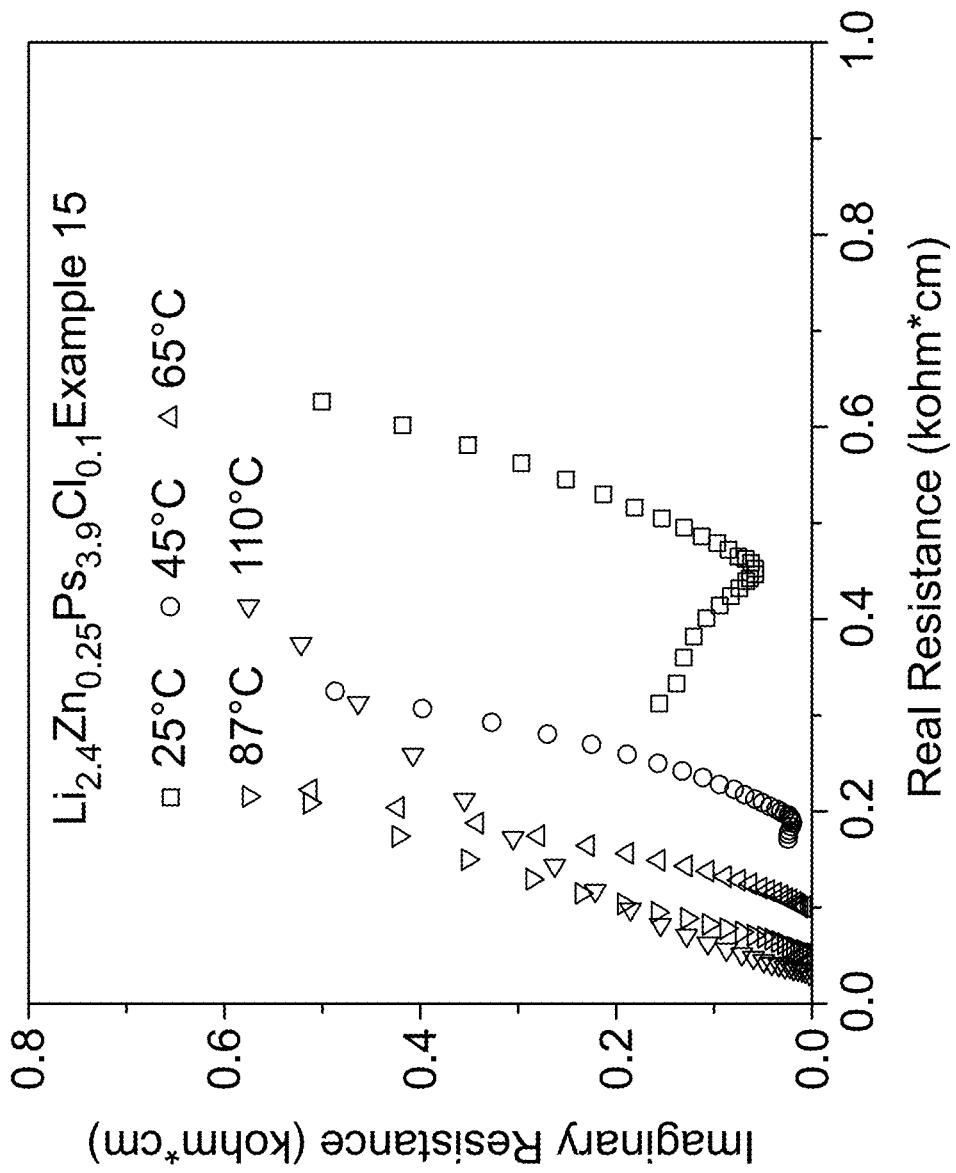
FIG. 14 is a graph of imaginary resistance (Z", kilo-ohm centimeters, kΩcm) versus real resistance (Z', kΩcm) showing the results of AC impedance analysis of Example 15.
Figure 15:
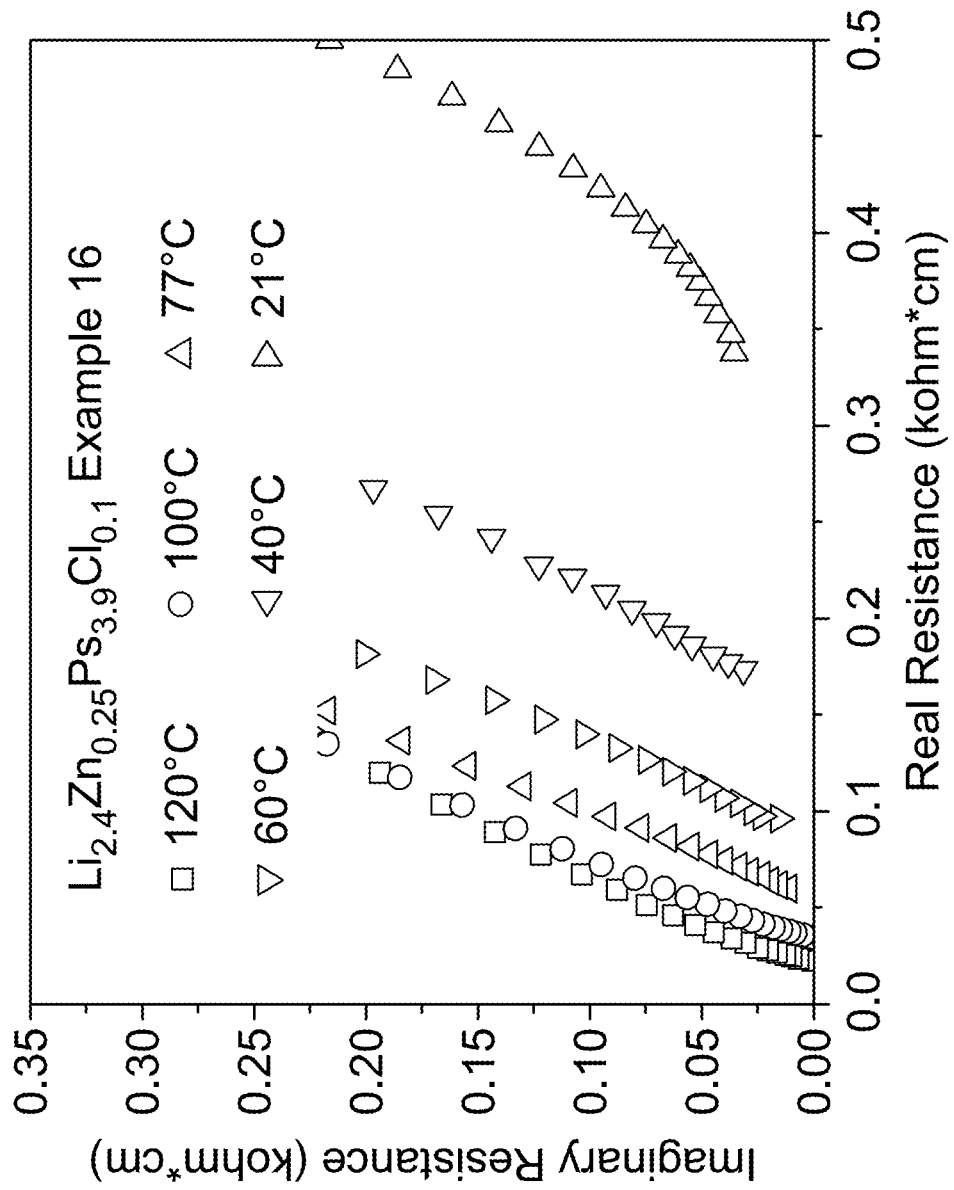
FIG. 15 is a graph of imaginary resistance (Z", kilo-ohm centimeters, kΩcm) versus real resistance (Z', kΩcm) showing the results of AC impedance analysis of Example 16.
Figure 16:
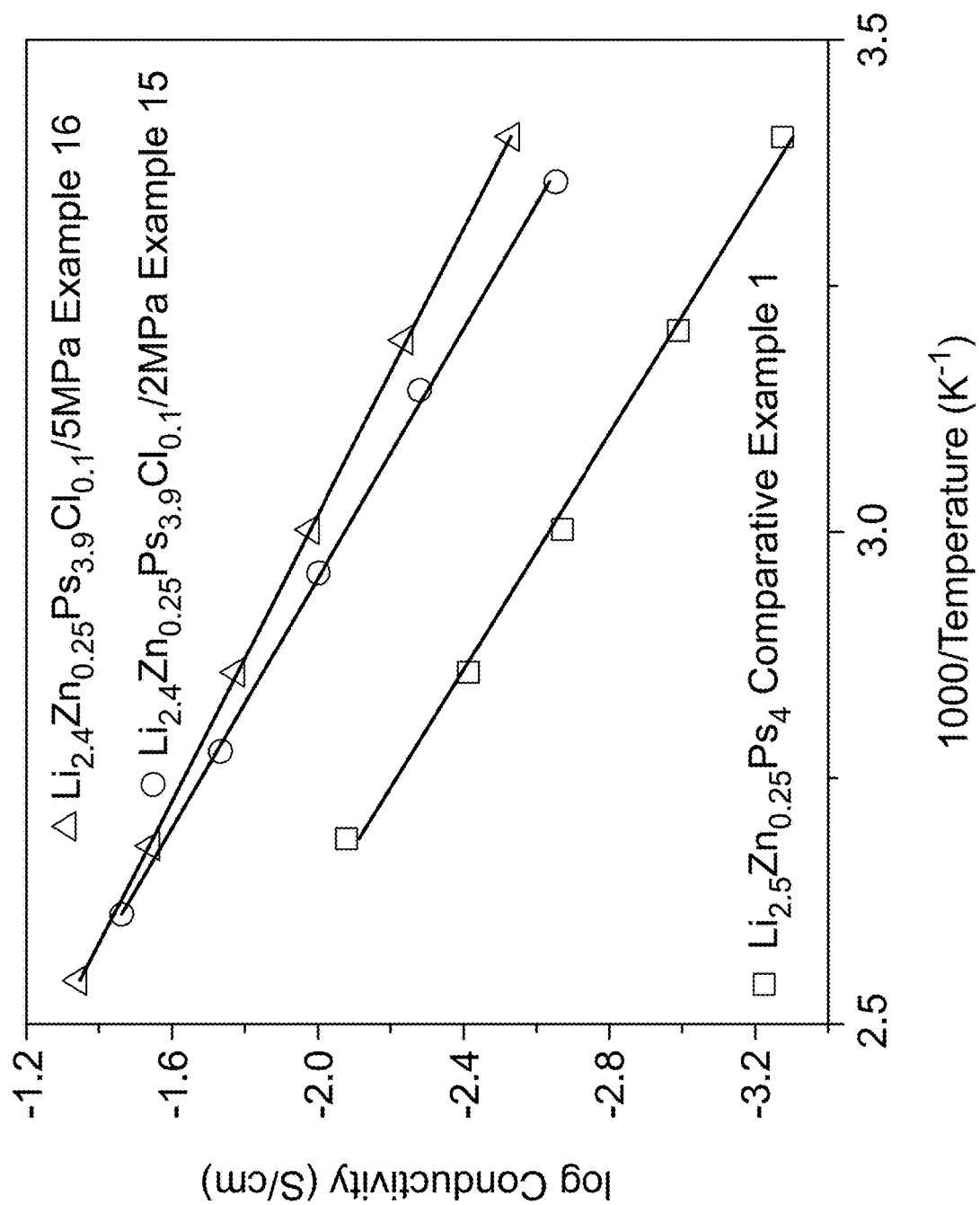
FIG. 16 is an Arrhenius plot of lithium ion conductivity (log σ (siemens per centimeter, (S/cm)) versus reciprocal temperature (Kelvin$^{-1}$, K$^{-1}$) for Comparative Example 1, Example 15, and Example 16.

The activation energy and conductivity of Comparative Example 1, Example 15, and Example 16 are determined by AC impedance analysis. Shown in FIG. 13 are the results of impedance analysis for Comparative Example 1 at 21° C., 39° C. 6° C., 77° C., and 99° C. Shown in FIG. 14 are the results of impedance analysis of Example 15 at 25° C., 45° C., 65° C., 87° C., and 110° C. Shown in FIG. 15 are the results of impedance analysis of Example 16 at 21° C., 40° C., 66° C., 77° C., 100° C., and 120° C. An Arrhenius plot of the log of conductivity versus the inverse of temperature is shown in FIG. 16. The activation energy and conductivity of Comparative Example 1, example 15, and Example 16 are summarized in Table 3. The activation energy and conductivity of Example 7 is determined similarly. These results show that addition of a halogen provides reduced activation energy and improved conductivity. Also, and while not wanting to be bound by theory, the increase conductivity and reduced activation energy of Example 16 is understood to be a result of the use of increased pressure, which is understood to reduce grain-battery resistance.

Figure 17:
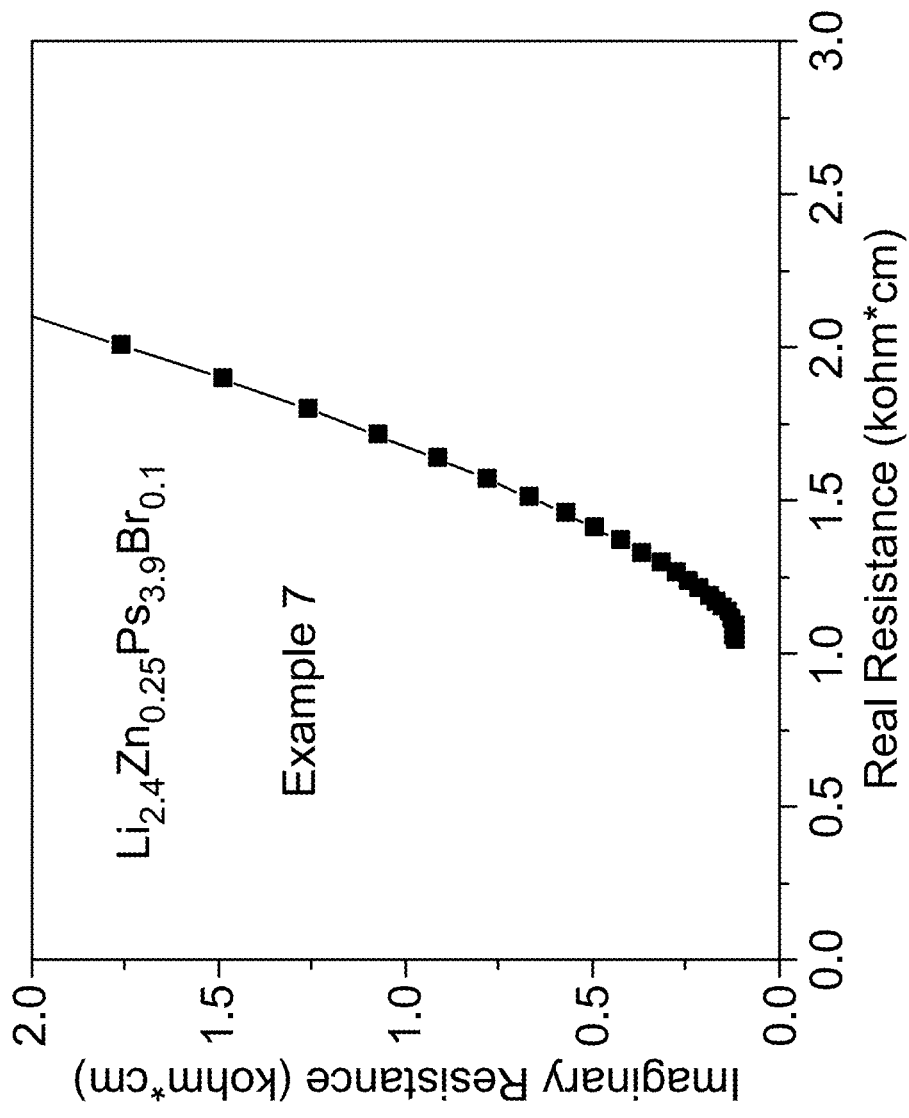
FIG. 17 is a graph of imaginary resistance (Z", kilo-ohm centimeters, kΩcm) versus real resistance (Z', kΩcm) showing the results of AC impedance analysis of Example 7.

The conductivity of Example 7 is evaluated similarly, the results of which are shown in FIG. 17. Relative to Comparative Example 1, addition of Br provides improved conductivity, 0.9 mS/cm. However, and while not wanting to be bound by theory, it is understood the larger lot ionic radius of bromine relative to $S^{2-}$ makes substitution of $S^{2-}$ with Br more difficult than $Cl^-$, for example.

TABLE 3

| Example | Composition | Activation Energy (eV) | Conductivity (mS/cm) |
|---|---|---|---|
| Comparative Example 1 | $Li_{2.5}Zn_{0.25}PS_4$ | 0.33 | 0.55 |
| Example 1 | $Li_{2.4}Zn_{0.25}PS_{3.9}Cl_{0.1}$ | 0.31 | 2 |
| Example 7 | $Li_{2.4}Zn_{0.25}PS_{3.9}Br_{0.1}$ | — | 0.9 |
| Example 15 | $Li_{2.4}Zn_{0.25}PS_{3.9}Cl_{0.1}$ (2 MP) | — | 3 |
| Example 16 | $Li_{2.4}Zn_{0.25}PS_{3.9}Cl_{0.1}$ (5 MPa) | 0.27 | 3.1 |

Stability Test

Figure 18:
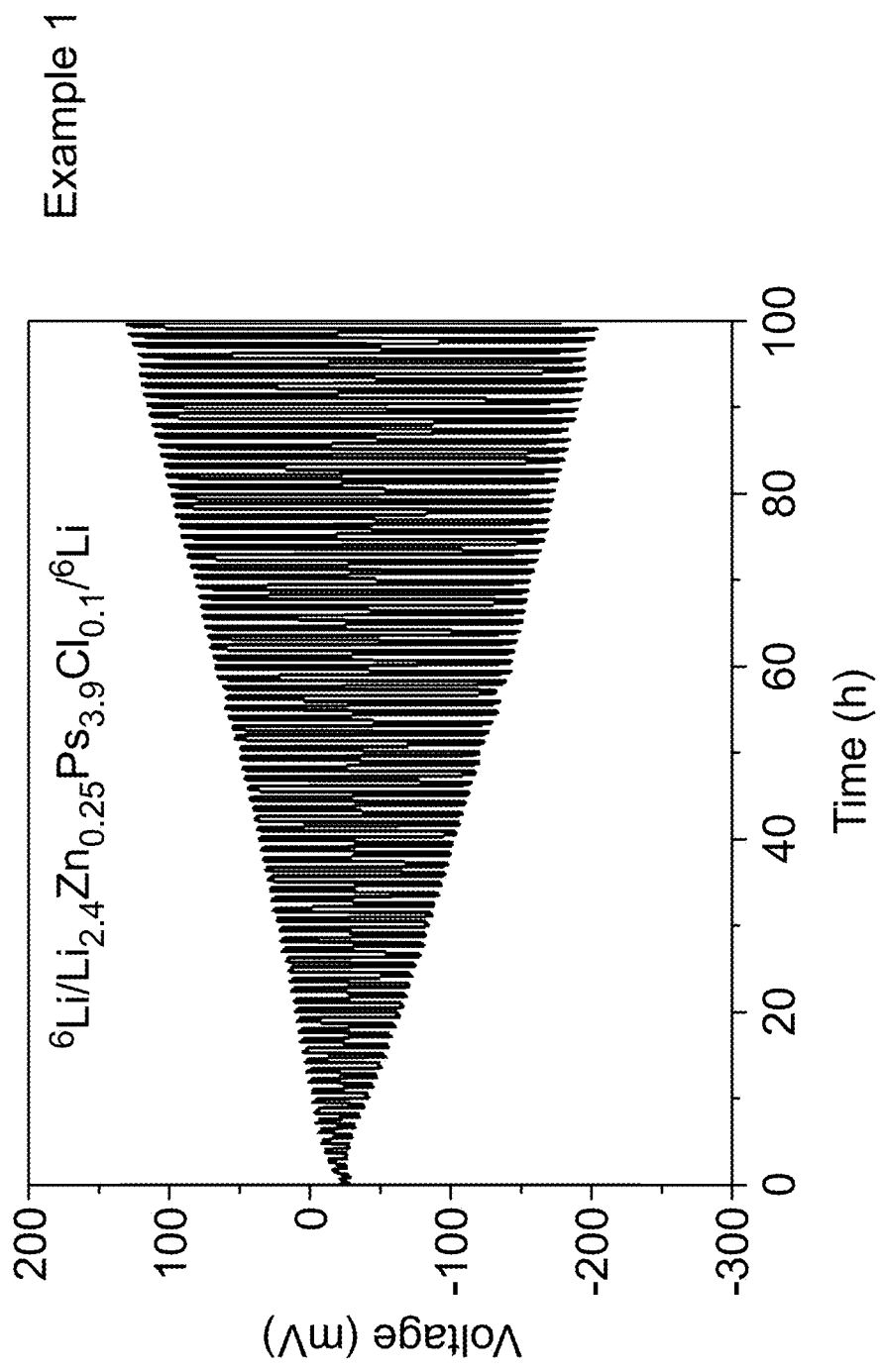
FIG. 18 is a graph of voltage (millivolts, mV) versus time (hours, h) showing the results of a stability test of Example 1 ($Li_{2.4}Zn_{0.25}PS_{3.9}Cl_{0.1}$) using a current density limit of 0.02 milliamperes per square centimeter (mA/cm$^2$)

The stability of the product of Example 1 versus lithium metal was evaluated by cycling a cell having lithium metal cathode and anode, and electrolyte of the $Li_{2.4}Zn_{0.25}PS_{3.9}Cl_{0.1}$ of Example 1 using a current density limit of 0.02 milliamperes per square centimeter ($mA/cm^2$). The results are shown in FIG. 18. As shown, the voltage increased over time, consistent with an increase in interfacial resistance, and indicating that $Li_{2.4}Zn_{0.25}PS_{3.9}Cl_{0.1}$ can react with lithium metal.

Prophetic Example

Preparation of all-Solid-State Battery Using Solid Electrolyte Material

Example 18

Figure 19:
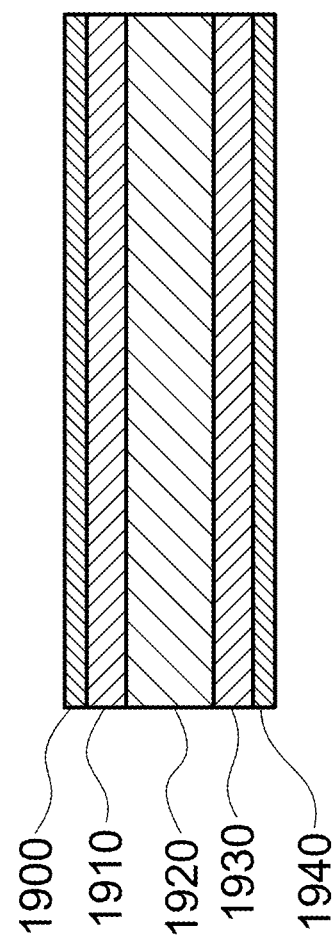
FIG. 19 is a schematic diagram of a battery.

A positive electrode 1910 comprising $LiNi_{0.5}Mn_{0.3}Co_{0.2}O_2$ (NCM) as a positive active material and carbon nanofiber (CNF) as a conductive agent will be provided. A negative electrode 1930 comprising $Li_4Ti_5O_{12}$ (LTO) as a negative active material and carbon nanofiber (CNF) as a conductive agent will be provided. The solid electrolyte 1920 prepared according to Example 1 will be disposed between the positive electrode and the negative electrode to form a cell. An aluminum foil positive current collector 1900 will be disposed on the positive electrode and a copper foil current collector 1940 will be disposed on the negative electrode to manufacture a battery, shown schematically in FIG. 19.

It should be understood that embodiments described herein should be considered in a descriptive sense only and not for purposes of limitation. Descriptions of features or aspects within each embodiment should be considered as available for other similar features or aspects in other embodiments.

What is claimed is:

1. A compound of Formula 1:

$$Li_{1+2x-y}Zn_{1-x}PS_{4-y-\delta}A_y \quad (1)$$

wherein A is a halogen, $0 \leq x \leq 1$, $0 \leq y \leq 0.5$, and $0 \leq \delta \leq 0.5$.

2. The compound of claim 1, wherein A is Cl, Br, I, or a combination thereof.

3. The compound of claim 2, wherein A is Cl or Br.

4. The compound of claim 1, wherein a crystal structure of the compound of Formula 1 comprises a body-centered cubic anion lattice.

5. The compound of claim 4, wherein the body-centered cubic anion lattice comprises corner sharing $ZnS_4$ and $PS_4$ tetrahedra.

6. The compound of claim 1, wherein the compound has a lithium ion conductivity of $1 \times 10^{-4}$ millisiemens per centimeter to 10 millisiemens per centimeter.

7. The compound of claim 1, wherein the compound comprises a resonance from $P^{4+}$, when analyzed by $^{31}P$ Nuclear Magnetic Resonance Spectroscopy.

8. The compound of claim 7, wherein the $P^{4+}$ resonance comprises
a first resonance at 105 parts per million to 111 parts per million, and
a second resonance at 115 parts per million 125 parts per million, or a combination thereof, when analyzed by $^{31}P$ Nuclear Magnetic Resonance Spectroscopy.

9. The compound of claim 7, wherein an area of the $P^{4+}$ resonance is 0.1% to 25%, based on the total area of the phosphorous resonance.

10. A protected positive electrode active material comprising:
a positive electrode active material; and
the compound of claim 1 on a surface of the positive electrode active material.

11. A protected positive electrode comprising:
a positive electrode comprising a positive electrode active material; and
the compound of claim 1 on the positive electrode.

12. A protected negative electrode active material comprising:
a negative electrode active material; and
the compound of claim 1 on a surface of the negative electrode active material.

13. A protected negative electrode comprising:
a negative electrode comprising a negative electrode active material; and
the compound of claim 1 on the negative electrode.

14. A lithium battery comprising:
a positive electrode;
a negative electrode; and
the compound of claim 1 between the positive electrode and the negative electrode.

15. An electrolyte composition comprising:
the compound of claim 1; and
a solvent, a binder, or a combination thereof.

16. A method of preparing a lithium-ion conductor, the method comprising:
providing an element A precursor, a Li precursor, a P precursor, a Zn precursor, and a S precursor;

contacting the element A precursor, the Li precursor, the P precursor, the Zn precursor, and the S precursor to prepare a mixture; and heat-treating the mixture to prepare the compound of Formula 1

$$Li_{1+2x-y}Zn_{1-x}PS_{4-y-\delta}A_y \quad (1)$$

wherein A is a halogen, $0 \leq x \leq 1$, $0 \leq y \leq 0.5$, and $0 \leq \delta \leq 0.5$.

17. The method of claim 16, wherein the P precursor and the S precursor are a same precursor.

18. The method of claim 16, wherein the heat-treating of the mixture comprises:
    a first heat-treating to provide a first heat-treated product;
    disposing a composition comprising the element A precursor, the Li precursor, the P precursor, the Zn precursor, and the S precursor on the first heat-treated product; and
    a second heat-treating to provide the compound of Formula 1.

19. A method of manufacturing a lithium battery, the method comprising:
    providing a positive electrode;
    providing a negative electrode; and
    disposing an electrolyte layer comprising the compound of claim 1 between the positive electrode and the negative electrode to manufacture the lithium battery.

20. The compound of claim 1, wherein x is $0 \leq x < 1$.

21. The compound of claim 20, wherein the compound of Formula 1 is $Li_{2.4}Zn_{0.25}PS_{3.9}Cl_{0.1}$.

22. The method of claim 16, wherein y is $0 < y \leq 0.5$.

23. The method of claim 16, wherein x is $0 \leq x < 1$.

* * * * *